United States Patent
Lunardi et al.

(10) Patent No.: US 12,445,888 B2
(45) Date of Patent: Oct. 14, 2025

(54) QoE MEASUREMENT HANDLING AT OVERLOAD IN RAN

(71) Applicant: Telefonaktiebolaget LM Ericsson (publ), Stockholm (SE)

(72) Inventors: Luca Lunardi, Genoa (IT); Johan Rune, Lidingö (SE); Ali Parichehrehteroujeni, Linköping (SE); Filip Barac, Huddinge (SE); Cecilia Eklöf, Täby (SE); Angelo Centonza, Torrenueva Costa (ES)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 423 days.

(21) Appl. No.: 18/014,183

(22) PCT Filed: Jun. 29, 2021

(86) PCT No.: PCT/SE2021/050641
§ 371 (c)(1),
(2) Date: Jan. 3, 2023

(87) PCT Pub. No.: WO2022/005376
PCT Pub. Date: Jan. 6, 2022

(65) Prior Publication Data
US 2023/0319616 A1  Oct. 5, 2023

Related U.S. Application Data

(60) Provisional application No. 63/047,988, filed on Jul. 3, 2020.

(51) Int. Cl.
*H04W 4/00* (2018.01)
*H04W 24/10* (2009.01)
*H04W 28/02* (2009.01)

(52) U.S. Cl.
CPC ....... *H04W 24/10* (2013.01); *H04W 28/0284* (2013.01); *H04W 28/0289* (2013.01)

(58) Field of Classification Search
CPC ............ H04W 24/10; H04W 28/0284; H04W 28/0289
See application file for complete search history.

(56) References Cited

U.S. PATENT DOCUMENTS

| | | | |
|---|---|---|---|
| 10,455,459 B2 * | 10/2019 | Hahn | H04W 36/0011 |
| 2013/0064120 A1 * | 3/2013 | Bodog | H04W 24/10 370/252 |

(Continued)

FOREIGN PATENT DOCUMENTS

| | | |
|---|---|---|
| WO | 2019096292 A1 | 5/2019 |
| WO | 2020128657 A1 | 6/2020 |
| WO | 2022005379 A1 | 1/2022 |

OTHER PUBLICATIONS

Author Unknown, "Technical Specification Group Services and System Aspects; System architecture for the 5G System (5GS); Stage 2 (Release 16)," Technical Specification 23.501, Version 16.4.0, Mar. 2020, 3GPP Organizational Partners, 430 pages.

(Continued)

*Primary Examiner* — Abdelnabi O Musa
(74) *Attorney, Agent, or Firm* — Withrow & Terranova, PLLC

(57) ABSTRACT

Systems and methods are disclosed herein for Quality of Experience (QoE) measurements handling at overload in a Radio Access Network (RAN) of a cellular communications system. In one embodiment, a method performed by a first RAN node for handling QoE measurement configuration and/or reporting during RAN overload comprises performing one or more actions related to one or more aspects of QoE measurement configuration, QoE measurement reporting, or both QoE measurement configuration and QoE (Continued)

measurement reporting that mitigate an RAN overload condition. In one embodiment, performing the one or more actions comprises performing one or more actions related to transfer of one or more aspects of QoE measurement configuration from the first RAN node to a second RAN node, transfer of one or more aspects of QoE measurement reporting from the first RAN node to the second RAN node, or both.

18 Claims, 26 Drawing Sheets

(56) References Cited

U.S. PATENT DOCUMENTS

| | | | |
|---|---|---|---|
| 2020/0092762 A1* | 3/2020 | Shi | H04W 36/0044 |
| 2020/0162949 A1* | 5/2020 | He | H04L 41/5032 |
| 2021/0075864 A1* | 3/2021 | Sun | H04W 28/0236 |
| 2023/0080089 A1* | 3/2023 | Hu | H04W 24/08 370/229 |

OTHER PUBLICATIONS

Author Unknown, "Technical Specification Group Radio Access Network; Radio Resource Control (RRC); Protocol specification (Release 16)," Technical Specification 25.331, Version 16.0.0, Mar. 2020, 3GPP Organizational Partners, 2,319 pages.
Technical Specification Group Services and System Aspects; Telecommunication management; Quality of Experience (QoE) measurement collection; Control and configuration (Release 16), Technical Specification 28.405, Version 2.0.0, Jun. 2020, 3GPP Organizational Partners, 16 pages.
Author Unknown, "Technical Specification Group Services and System Aspects; Telecommunication management; Quality of Experience (QoE) measurement collection; Control and configuration (Release 16)," Technical Specification 28.405, Version 16.0.0, Jul. 2020, 3GPP Organizational Partners, 16 pages.
Author Unknown, "Technical Specification Group Services and System Aspects; 3G security; Network Domain Security (NDS); IP network layer security (Release 16)," Technical Specification 33.210, Version 16.3.0, Mar. 2020, 3GPP Organizational Partners, 27 pages.
Author Unknown, "Technical Specification Group Services and System Aspects; Security architecture and procedures for 5G system (Release 16)," Technical Specification 33.501, Version 16.2.0, Mar. 2020, 3GPP Organizational Partners, 227 pages.
Author Unknown, "Technical Specification Group Radio Access Network; Evolved Universal Terrestrial Radio Access (E-UTRA) and Evolved Universal Terrestrial Radio Access Network (E-UTRAN); Overall description; Stage 2 (Release 16)," Technical Specification 36.300, Version 16.1.0, Mar. 2020, 3GPP Organizational Partners, 386 pages.
Author Unknown, "Technical Specification Group Radio Access Network; Evolved Universal Terrestrial Radio Access (E-UTRA); Radio Resource Control (RRC); Protocol specification (Release 16)," Technical Specification 36.331, Version 16.0.0, Mar. 2020, 3GPP Organizational Partners, 1,048 pages.
Author Unknown, "Technical Specification Group Radio Access Network; Evolved Universal Terrestrial Radio Access Network (E-Utran); X2 application protocol (X2AP) (Release 16)," Technical Specification 36.423, Version 16.1.0, Mar. 2020, 3GPP Organizational Partners, 438 pages.

Author Unknown, "Technical Specification Group Radio Access Network; NR; NR and NG-RAN Overall Description; Stage 2 (Release 16)," Technical Specification 38.300, Version 16.1.0, Mar. 2020, 3GPP Organizational Partners, 133 pages.
Author Unknown, "Technical Specification Group Radio Access Network; NR; Radio Resource Control (RRC) protocol specification (Release 16)," Technical Specification 38.331, Version 16.0.0, Mar. 2020, 3GPP Organizational Partners, 835 pages.
Author Unknown, "Technical Specification Group Radio Access Network; NR; Backhaul Adaptation Protocol (BAP) specification (Release 16)," Technical Specification 38.340, Version 16.0.0, Mar. 2020, 3GPP Organizational Partners, 20 pages.
Author Unknown, "Technical Specification Group Radio Access Network; NG-RAN; Architecture description (Release 16)," Technical Specification 38.401, Version 16.1.0, Mar. 2020, 3GPP Organizational Partners, 50 pages.
Author Unknown, "Technical Specification Group Radio Access Network; NG-RAN; Xn application protocol (XnAP) (Release 16)," Technical Specification 38.423, Version 16.1.0, Mar. 2020, 3GPP Organizational Partners, 334 pages.
Author Unknown, "Technical Specification Group Radio Access Network; NG-RAN; E1 Application Protocol (E1AP) (Release 16)," Technical Specification 38.463, Version 16.0.0, Dec. 2019, 3GPP Organizational Partners, 190 pages.
Author Unknown, "Technical Specification Group Radio Access Network; NG-RAN; E1 Application Protocol (E1AP) (Release 16)," Technical Specification 38.463, Version 16.1.1, Apr. 2020, 3GPP Organizational Partners, 191 pages.
Author Unknown, "Technical Specification Group Radio Access Network; NG-RAN; F1 application protocol (F1AP) (Release 16)," Technical Specification 38.473, Version 16.0.0, Dec. 2019, 3GPP Organizational Partners, 239 pages.
Author Unknown, "Technical Specification Group Radio Access Network; NG-RAN; F1 application protocol (F1AP) (Release 16)," Technical Specification 38.473, Version 16.1.0, Mar. 2020, 3GPP Organizational Partners, 240 pages.
Author Unknown, "Technical Specification Group Radio Access Network; NR; Study on Integrated Access and Backhaul; (Release 16)," Technical Report 38.874, Version 16.0.0, Dec. 2018, 3GPP Organizational Partners, 111 pages.
Qualcomm, "RP-182882: New WID: Integrated Access and Backhaul for NR," 3GPP TSG RAN Meeting #82, Dec. 10-13, 2018, Sorrento, Italy, 7 pages.
Ericsson, "R2-1912638: Discussion on incoming LS for QoE measurement collection in LTE," 3GPP TSG RAN WG2 #107bis, Oct. 14-18, 2019, Chongqing, China, 6 pages.
Ericsson, "R2-2004624: QoE measurement collection additions," 3GPP TSG RAN2 Meeting #110, Jun. 1-12, 2020. Electronic Meeting, 80 pages.
Samsung, "R2-1901067: Security framework for the NR integrated access backhaul," 3GPP TSG-RAN WG2 Meeting #105, Feb. 25-Mar. 1, 2019, Athens, Greece, 4 pages.
SA4, "S4-200962: LS Reply on QoE Measurement Collection," 3GPP TSG-SA4 Meeting #109-e, May 20-Jun. 3, 2019, Electronic Meeting, 2 pages.
International Search Report and Written Opinion for International Patent Application No. PCT/SE2021/050641, mailed Sep. 29, 2021, 15 pages.
Author Unknown, "Technical Specification Group Services and System Aspects; Telecommunication management; Quality of Experience (QoE) measurement collection; Control and configuration (Release 16)," Technical Specification 28.405, Version 1.2.0 Mar. 2020, 3GPP Organizational Partners, 55 pages.

* cited by examiner

QoE MEASUREMENT HANDLING AT OVERLOAD IN RAN

RELATED APPLICATIONS

This application is a 35 U.S.C. § 371 national phase filing of International Application No. PCT/SE2021/050641, filed Jun. 29, 2021, which claims the benefit of provisional patent application Ser. No. 63/047,988, filed Jul. 3, 2020, the disclosures of which are hereby incorporated herein by reference in their entireties.

TECHNICAL FIELD

The present disclosure relates to Quality of Experience (QoE) measurements in a Radio Access Network (RAN) of a cellular communications system and, more specifically, to QoE measurement handling at overload in the RAN.

BACKGROUND

1 Overall Architecture of Next Generation (NG) Radio Access Network (RAN)

The overall architecture of the Next Generation Radio Access Network (NG-RAN) is described in Third Generation Partnership Project (3GPP) Technical Specification (TS) 38.401 V16.1.0, Section 6.1.1, which is reproduced below.

Start 3GPP TS 38.401 V16.1.0, Section 6.1.1

6.1.1 Overall Architecture of NG-RAN

Reproduced Herein as FIG. 1

FIGS. 6.1-1: Overall Architecture

The NG-RAN consists of a set of gNBs connected to the 5GC through the NG interface.
   NOTE: As specified in 38.300 [2]. NG-RAN could also consists of a set of ng-eNBs, an ng-eNB may consist of an ng-eNB-CU and one or more ng-eNB-DU(s). An ng-eNB-CU and an ng-eNB-DU is connected via WI interface. The general principle described in this section also applies to ng-eNB and WI interface, if not explicitly specified otherwise.
   An gNB can support FDD mode. TDD mode or dual mode operation.
   gNBs can be interconnected through the Xn interface.
   A gNB may consist of a gNB-CU and one or more gNB-DU(s). A gNB-CU and a gNB-DU is connected via F1 interface.
   One gNB-DU is connected to only one gNB-CU.
   NOTE: In case of network sharing with multiple cell ID broadcast, each Cell Identity associated with a subset of PLMNs corresponds to a gNB-DU and the gNB-CU it is connected to, i.e. the corresponding gNB-DUs share the same physical layer cell resources.
   NOTE: For resiliency, a gNB-DU may be connected to multiple gNB-CUs by appropriate implementation.
   NG. Xn and F1 are logical interfaces.
   For NG-RAN, the NG and Xn-C interfaces for a gNB consisting of a gNB-CU and gNB-DUs, terminate in the gNB-CU. For EN-DC, the S1-U and X2-C interfaces for a gNB consisting of a gNB-CU and gNB-DUs, terminate in the gNB-CU. The gNB-CU and connected gNB-DUs are only visible to other gNBs and the 5GC as a gNB. A possible deployment scenario is described in Annex A.
   The node hosting user plane part of NR PDCP (e.g. gNB-CU, gNB-CU-UP, and for EN-DC. MeNB or SgNB depending on the bearer split) shall perform user inactivity monitoring and further informs its inactivity or (re) activation to the node having C-plane connection towards the core network (e.g. over E1, X2). The node hosting NR RLC (e.g. gNB-DU) may perform user inactivity monitoring and further inform its inactivity or (re) activation to the node hosting control plane. e.g. gNB-CU or gNB-CU-CP.
   UL PDCP configuration (i.e. how the UE uses the UL at the assisting node) is indicated via X2-C(for EN-DC). Xn-C (for NG-RAN) and F1-C. Radio Link Outage/Resume for DL and/or UL is indicated via X2-U (for EN-DC). Xn-U (for NG-RAN) and F1-U.
   The NG-RAN is layered into a Radio Network Layer (RNL) and a Transport Network Layer (TNL).
   The NG-RAN architecture. i.e. the NG-RAN logical nodes and interfaces between them, is defined as part of the RNL.
   For each NG-RAN interface (NG. Xn. F1) the related TNL protocol and the functionality are specified. The TNL provides services for user plane transport, signalling transport.
   In NG-Flex configuration, each NG-RAN node is connected to all AMFs of AMF Sets within an AMF Region supporting at least one slice also supported by the NG-RAN node. The AMF Set and the AMF Region are defined in 3GPP TS 23.501 [3].
   If security protection for control plane and user plane data on TNL of NG-RAN interfaces has to be supported, NDS/IP 3GPP TS 33.501 shall be applied.

End 3GPP TS 38.401 V16.1.0, Section 6.1.1

2 Overall Architecture for Separation of the Control Plane Part (gNB-CU-CP) of the Next Generation Node B (gNB) Central Unit (gNB-CU) and the User Plane Part (gNB-CU-UP) of the gNB-CU The overall architecture for separation of gNB-CU-CP and gNB-CU-UP of the gNB-CU is described in 3GPP TS 38.401 V16.1.0, Section 6.1.2, which is reproduced below.

Start 3GPP TS 38.401 V16.1.0, Section 6.1.2

The overall architecture for separation of gNB-CU-CP and gNB-CU-UP is depicted in FIG. 6.1.2-1.

Reproduced Herein as FIG. 2

FIG. 6.1.2-1. Overall Architecture for Separation of gNB-CU-CP and gNB-CU-UP A gNB may consist of a gNB-CU-CP, multiple gNB-CU-UPs and multiple gNB-DUs;
The gNB-CU-CP is connected to the gNB-DU through the F1-C interface;
The gNB-CU-UP is connected to the gNB-DU through the F1-U interface;
The gNB-CU-UP is connected to the gNB-CU-CP through the E1 interface;
One gNB-DU is connected to only one gNB-CU-CP;
One gNB-CU-UP is connected to only one gNB-CU-CP;

NOTE 1: For resiliency, a gNB-DU and/or a gNB-CU-UP may be connected to multiple gNB-CU-CPs by appropriate implementation.

One gNB-DU can be connected to multiple gNB-CU-UPs under the control of the same gNB-CU-CP;

One gNB-CU-UP can be connected to multiple DUs under the control of the same gNB-CU-CP;

NOTE 2: The connectivity between a gNB-CU-UP and a gNB-DU is established by the gNB-CU-CP using Bearer Context Management functions.

NOTE 3: The gNB-CU-CP selects the appropriate gNB-CU-UP(s) for the requested services for the UE. In case of multiple CU-UPs they belong to same security domain as defined in TS 33.210 [18].

NOTE 4: Data forwarding between gNB-CU-UPs during intra-gNB-CU-CP handover within a gNB may be supported by Xn-U.

End 3GPP TS 38.401 V16.1.0, Section 6.1.2

3 Overall Architecture of Integrated Access and Backhaul (IAB)

FIG. 3 illustrates the overall architecture of IAB for both NR and Long Term Evolution (LTE), and FIG. 4 is a reference diagram for the IAB architecture. The NG-RAN supports IAB by the IAB-node wirelessly connecting to the gNB capable of serving the IAB-nodes. This NG-RAN node is referred to as an "IAB-donor". The IAB-donor consists of an IAB-donor-CU (i.e., a Central Unit (CU) of the IAB-donor) and one or more IAB-donor-DUs (i.e., one or more Distributed Units (DU) of the IAB-donor). In case of separation of gNB-CU-CP and gNB-CU-UP, the IAB-donor may consist of an IAB-donor-CU-CP, multiple IAB-donor-CU-UPs, and multiple IAB-donor-DUs.

The IAB-node connects to an upstream IAB-node or an IAB-donor-DU via a subset of the User Equipment (UE) functionalities of the New Radio (NR) Uu interface (referred to as the "IAB Mobile Termination (IAB-MT) function" of IAB-node). The IAB-node provides wireless backhaul to the downstream IAB-nodes and UEs via the network functionalities of the NR Uu interface (referred to as the "IAB-DU function" of IAB-node).

The F1-C traffic between an IAB-node and IAB-donor-CU is backhauled via the IAB-donor-DU and optional intermediate hop IAB-node(s). The F1-U traffic between an IAB-node and IAB-donor-CU is backhauled via the IAB-donor-DU and optional intermediate hop IAB-node(s).

All functions specified for a gNB-DU are equally applicable for an IAB-DU and IAB-donor-DU, unless otherwise stated, and all functions specified for a gNB-CU are equally applicable for an IAB-donor-CU, unless otherwise stated. All functions specified for the UE context are equally applicable for managing the context of IAB-MT, unless otherwise stated.

4 Protocol Stacks of IAB

FIG. 5 shows the protocol stack for F1-U between IAB-DU and the IAB-donor-CU-UP, and FIG. 6 shows the protocol stack for F1-C between IAB-DU and the IAB-donor-CU-CP. In these example figures, F1-U and F1-C are carried over two backhaul hops.

Note that the F1 interference needs to be security-protected as described in 3GPP TS 33.501. The security layer is not shown in the FIGS. 5 and 6.

FIG. 7 shows the protocol stack for F1-C between IAB-DU and the IAB-donor-CU-CP, when the F1-C traffic is transmitted via the Master evolved Node B (MeNB).

5 Quality of Experience (QoE) in Legacy Solution

Quality of Experience (QoE) measurements have been specified for LTE and Universal Mobile Telecommunications System (UMTS). The purpose of the application layer measurements is to measure the end user experience when using certain applications. Currently, QoE measurements for streaming services and for Mobile Telephone Service for Internet Protocol Multimedia Subsystem (MTSI) services are supported.

The solutions in LTE and UMTS are similar with the overall principles as follows. QoE Measurement Collection enables configuration of application layer measurements in the User Equipment (UE) and transmission of QoE measurement result files by means of Radio Resource Control (RRC) signaling. Application layer measurement configuration received from Operations and Management (OAM) or the Core Network (CN) is encapsulated in a transparent container, which is forwarded to UE in a downlink RRC message. Application layer measurements received from UE's higher layer are encapsulated in a transparent container and sent to network in an uplink RRC message. The result container is forwarded to a Trace Collector Entity (TCE).

In 3GPP release 17, a new study item for "Study on NR QoE management and optimizations for diverse services" for NR has been approved. The purpose of the study item is to study solutions for QoE measurements in NR. QoE management in NR will not just collect the experience parameters of streaming services but also consider the typical performance requirements of diverse services (e.g., Augmented Reality (AR)/Virtual Reality (VR) and Ultra-Reliable Low-Latency Communication (URLLC)). Based on requirements of services, the NR study will also include more adaptive QoE management schemes that enable network intelligent optimization to satisfy user experience for diverse services.

The measurements may be initiated towards the RAN in a management-based manner, i.e. from an O&M node in a generic way, e.g., for a group of UEs, or they may also be initiated in a signaling-based manner, i.e. initiated from the Core Network (CN) to the RAN, e.g., for a single UE. The configuration of the measurement includes the measurement details, which is encapsulated in a container that is transparent to RAN.

When initiated via the CN, the measurement is started towards a specific UE. For the LTE case, the "TRACE START" S1AP message is used, which carries, among others, the details about the measurement configuration the application should collect (in the "Container for application layer measurement configuration" IE, transparent to the RAN) and the details to reach the trace collection entity to which the measurements should be sent.

The RAN is not aware of when the streaming session is ongoing in the UE Access Stratum and is also not aware of when the QoE measurements are ongoing. When the RAN stops the measurements is an implementation decision. Typically, it is done when the UE has moved outside the measured area.

One opportunity provided by the legacy solution is also to be able to keep the QoE measurement for the whole session, even during a handover situation.

6 QoE Measurement in Universal Terrestrial RAN (UTRAN)

UTRAN—Application Layer Measurement Capabilities

According to 3GPP TS 25.331, the UTRAN can request the UE (via "UE Capability Enquiry") to report its capability via a UE capability enquiry procedure, as shown in FIG. 8.

The UE can provide its capability using the "UE Capability Information" RRC message as shown in FIG. 9. The "UE Capability Information" message can include the "UE radio access capability" (see excerpt below from 3GPP TS 25.331).

| ***START EXCERPT FROM 3GPP TS 25.331 V16.0.0*** | | | | | |
|---|---|---|---|---|---|
| Information Element/Group name | Need | Multi | Type and reference | Semantics description | Version |
| Measurement capability | OP | | Measurement capability 10.3.3.21 | | |
| ***END EXCERPT FROM 3GPP TS 25.331 V16.0.0*** | | | | | |

The "Measurement Capability" Information Element (IE) can be sent from the UE to the UTRAN to transfer the information related to the capability to perform the QoE measurement collection for streaming services and/or MTSI services. An excerpt from 3GPP TS 25.331 that shows an extract of the "Measurement Capability" IE is provided below.

| ***START EXCERPT FROM 3GPP TS 25.331 V16.0.0*** | | | | | |
|---|---|---|---|---|---|
| Information Element/Group name | Need | Multi | Type and reference | Semantics description | Version |
| QoE Measurement Collection for streaming services | CV-not_IRAT_HoInfo | | Enumerated (TRUE) | TRUE means that the UE supports QoE Measurement Collection for streaming services. | REL-14 |
| QoE Measurement Collectionf or MTSI services | CV-not_IRAT_HoInfo | | Enumerated (TRUE) | TRUE means that the UE supports QoE Measurement Collection for MTSI services. | REL-15 |
| ***END EXCERPT FROM 3GPP TS 25.331 V16.0.0*** | | | | | |

UTRAN—QoE Measurement Configuration—RRC Signaling

To configure QoE measurement in the UE, the UTRAN can send a "Measurement Control" RRC message containing "Application layer measurement configuration", as illustrated in FIG. 10. The content of the "Application layer measurement configuration" IE is represented in the table below.

| Information Element/Group name | Need | Multi | Type and reference | Semantics description | Version |
|---|---|---|---|---|---|
| Container for application layer measurement configuration | MP | | Octet string (1 ... 1000) | | REL-14 |
| Service type | MP | | Enumerated (QoEStreaming, QoEMTSI) | | REL-15 |

UTRAN—QoE Measurement Reporting—RRC Signaling

The UE can send QoE measurement results via UTRAN to the Collecting Entity using the "Measurement Report" RRC message and including the "Application layer measurement reporting" IE, as illustrated in FIG. 11. The UE may also perform Cell Update with cause "application layer measurement report available" in order to initiate the transfer of application layer measurement report. Signaling radio bearer RB4 is used for the MEASUREMENT REPORT message carrying the IE "Application layer measurement reporting". The content of the "Application layer measurement reporting" IE is represented in the table below.

| Information Element/Group name | Need | Multi | Type and reference | Semantics description | Version |
|---|---|---|---|---|---|
| Container for application layer measurement reporting | MP | | Octet string (1 ... 8000) | | REL-14 |
| Service type | MP | | Enumerated (QoEStreaming, QoEMTSI) | | REL-15 |

7 QoE Measurement in Evolved UTRAN (E-UTRAN)

E-UTRAN—Application Layer Measurement Capabilities

For E-UTRAN, the UE capability transfer is used to transfer UE radio access capability information from the UE to E-UTRAN. FIG. 12 illustrates the UE capability transfer procedure in E-UTRAN. The UE-EUTRA-Capability IE is used to convey the E-UTRA UE Radio Access Capability Parameters and the Feature Group Indicators for mandatory features to the network. In the response message "UECapabilityInformation", the UE can include the "UE-EUTRA-Capability" IE. The "UE-EUTRA-Capability" IE may include the UE-EUTRA-Capability-v1530-IE which can be used by the UE to indicate whether the UE supports or not QoE Measurement Collection for streaming services and/or MTSI services, as detailed in the "MeasParameters-v1530" encoding below.

As shown below, the contribution CR 4297 (R2-2004624) for 3GPP TS 36.331 v16.0.0 at the 3GPP TSG RAN2 Meeting #110 proposed an extension of the "UE-EUTRA-Capability" IE that, within the "UE-EUTRA-Capability-v16xy-IE", the UE-EUTRA-Capability IE may include a "measParameters-v16xy" comprising the qoe-Extensions-r16 IE. The qoe-Extensions-r16 IE may be used to indicate whether the UE supports the release 16 extensions for QoE Measurement Collection, i.e. if the UE supports more than one QoE measurement type at a time and if the UE supports the signaling of withinArea, sessionRecordingIndication, qoe-Reference, temporaryStopQoE and restartQoE.

the procedure when configured with application layer measurement, i.e. when measConfigAppLayer has been configured by E-UTRAN. As stated in the 3GPP specifications, upon initiating the procedure, the UE shall:
1> if configured with application layer measurement, and SRB4 is configured, and the UE has received application layer measurement report information from upper layers:
2> set the measReportAppLayerContainer in the MeasReportAppLayer message to the value of the application layer measurement report information;
2> set the serviceType in the MeasReportAppLayer message to the type of the application layer measurement report information;
2> submit the MeasReportAppLayer message to lower layers for transmission via SRB4.

E-UTRAN—QoE Measurement Configuration Setup and Release—RRC Signaling

The RRCConnectionReconfiguration message is used to reconfigure the UE to setup or release the UE for Application Layer measurements. This is signaled in the measConfigAppLayer-15 IE within the "OtherConfig" IE. The setup

```
MeasParameters-v1530 ::=           SEQUENCE {
    qoe-MeasReport-r15             ENUMERATED {supported}      OPTIONAL,
    qoe-MTSI-MeasReport-r15        ENUMERATED {supported}      OPTIONAL,
    ca-IdleModeMeasurements-r15    ENUMERATED {supported}      OPTIONAL,
    ca-IdleModeValidityArea-r15    ENUMERATED {supported}      OPTIONAL,
    heightMeas-r15                 ENUMERATED {supported}      OPTIONAL,
    multipleCellsMeasExtension-r15 ENUMERATED {supported}      OPTIONAL
}
MeasParameters-v16xy ::=           SEQUENCE {
    qoe-Extensions-r16                        ENUMERATED {supported}
    OPTIONAL
}
``` qoe-MeasReport
Indicates whether the UE supports QoE Measurement Collection for streaming services.
qoe-MTSI-MeasReport
Indicates whether the UE supports QoE Measurement Collection for MTSI services.
qoe-Extensions
Indicates whether the UE supports the release 16 extensions for QoE Measurement Collection,
i.e. support of more than one QoE measurement type at a time and signalling of withinArea,
sessionRecordingIndication, qoe-Reference, temporaryStopQoE and restartQoE.
temporaryStopQoE
Indicates that reporting, but not collection, of QoE measurements shall be temporarily stopped.
withinArea
The field indicates at handover, for each application layer measurement, whether the new cell is inside
the area for the measurement, i.e. whether the UE is allowed to start new measurements in the cell.
restartQoE
Indicates that QoE measurements can be reported again after a temporary stop.

The QoE-Reference contains the parameter QoE Reference as defined in 3GPP TS 28.405 and shown below.

```
-- ASN1START
QoE-Reference-r16 ::=    SEQUENCE {
    plmn-Identity-r16    PLMN-Identity,
    qmc-Id-r16           OCTET STRING (SIZE (3))
}
ASN1STOP
```

E-UTRAN—Application Layer Measurement Reporting

The purpose of the "Application layer measurement reporting" procedure described in 3GPP TS 36.331 and shown in FIG. 13 is to inform E-UTRAN about application layer measurement report. A UE capable of application layer measurement reporting in RRC_CONNECTED may initiate includes the transparent container measConfigAppLayerContainer which specifies the QoE measurement configuration for the Application of interest and the serviceType IE to indicates the Application (or service) for which the QoE measurements are being configured. Supported services are streaming and MTSI.

The contribution CR 4297 (R2-2004624) for 3GPP TS 36.331 v16.0.0 at the 3GPP TSG RAN2 Meeting #110 proposed to extend the QoE measurement configuration, as illustrated below. The measConfigAppLayerToAddModList-r16 may be used to add or modify multiple QoE measurement configurations (up to maxQoE-Measurement-r16). The measConfigAppLayerToReleaseList-r16 IE may be used to remove multiple QoE measurement configuration (up to maxQoE-Measurement-r16). Below the details of the OtherConfig IE related to measConfigAppLayer-r15, measConfigAppLayerToAddModList-r16 and measConfigAppLayerToReleaseList-r16.

```
measConfigAppLayer-r15        CHOICE {
  release         NULL,
  setup                       SEQUENCE {
    measConfigAppLayerContainer-r15      OCTET STRING (SIZE(1..1000)),
    serviceType-r15                      ENUMERATED {qoe, qoemtsi, spare6,
       spare5, spare4, spare3, spare2, spare1}
}
measConfigAppLayerToAddModList-r16   SEQUENCE
   (SIZE (1.. maxQoE-Measurement-r16)) OF    MeasConfigAppLayer-r16
      OPTIONAL   -- Need ON
measConfigAppLayerToReleaseList-r16        SEQUENCE
   (SIZE (1.. maxQoE-Measurement-r16)) OF    MeasReleaseAppLayer-r16
      OPTIONAL   -- Need ON
MeasConfigAppLayer-r16 ::= SEQUENCE {
   measConfigAppLayerContainer-r15   OCTET STRING (SIZE(1..1000))   OPTIONAL,
      -- Need ON
   serviceType-r16           ServiceType-r16   OPTIONAL,  -- Need ON
   qoe-Reference-r16                 OPTIONAL,  -- Need ON
   withinArea-r16 ENUMERATED {inside, outside}   OPTIONAL,  -- Need ON
   temporaryStopQoE-r16            BOOLEAN,
   restartQoE-r16                  BOOLEAN
}
   Meas ReleaseAppLayer-r16 ::= SEQUENCE {
   serviceType-r16           ServiceType-r16  OPTIONAL,   -- Need ON
   qoe-Reference-r16            OPTIONAL   --Need ON
}
``` measConfigAppLayerContainer
The field contains configuration of application layer measurements, see Annex L (normative) in TS 26.247 and clause 16.5 in TS 26.114.
serviceType
Indicates the type of application layer measurement. Value qoe indicates Quality of Experience Measurement Collection for streaming services, value qoemtsi indicates Enhanced Quality of Experience Measurement Collection for MTSI.
measConfigAppLayerToAddModList
The field is used to setup or modify application layer measurements, see Annex L (normative) in TS 26.247 and clause 16.5 in TS 26.114.
measConfigAppLayerToReleaseList
The field is used to release application layer measurements, see Annex L (normative) in TS 26.247 and clause 16.5 in TS 26.114.

The ServiceType contains the service type of a certain QoE measurement as defined in TS 28.405 and illustrated below.

```
-- ASN1START
ServiceType-r16   ::=    ENUMERATED {qoe, qoemtsi, spare6, spare5, spare4,
                            spare3, spare2, spare1}
-- ASN1STOP
maxQoE-Measurement-r16       INTEGER ::= 8   -- Maximum number of QoE
Measurements
```

E-UTRAN—QoE Measurement Reporting—RRC Signaling

As specified in 3GPP TS 36.331, the MeasReportAppLayer RRC message is used by the UE to send to the E-UTRAN node the QoE measurement results of an Application (or service). The service for which the report is being sent is indicated in the "serviceType" IE. The details for the MeasReportAppLayer message, sent using Signaling Radio Bearer, SRB4, from the 3GPP specifications are shown below.

MeasReportAppLayer Message

```
-- ASN1START
MeasReportAppLayer-r15 ::=              SEQUENCE {
   criticalExtensions                   CHOICE {
      meas ReportAppLayer-r15           Meas ReportAppLayer-r15-IEs,
      criticalExtensions Future         SEQUENCE { }
   }
}
MeasReportAppLayer-r15-IEs ::=          SEQUENCE {
   measReportAppLayerContainer-r15      OCTET STRING (SIZE(1..8000))
```

```
OPTIONAL,
    serviceType-r15                     ENUMERATED
      {qoe, qoemtsi, spare6, spare5, spare4, spare3, spare2, spare1}
OPTIONAL,
    nonCriticalExtension    MeasReportAppLayer-v1590-IEs OPTIONAL
}
MeasReportAppLayer-v1590-IEs ::=        SEQUENCE {
    lateNonCriticalExtension            OCTET STRING  OPTIONAL,
    nonCriticalExtension                MeasReportAppLayer-IEs-v16xy
OPTIONAL
}
MeasReportAppLayer-IEs-v16xy ::=        SEQUENCE {
   qoe-Reference-r16          OPTIONAL,   -- Need ON
   recordingSessionIndication-r16         BOOLEAN   OPTIONAL,   -- Need ON
   nonCriticalExtension      SEQUENCE { }          OPTIONAL
}
-- ASN1STOP
```

| MeasReportAppLayer field descriptions |
|---|
| measReportAppLayerContainer<br>The field contains container of application layer measurements, see Annex L (normative) in TS 26.247 and clause 16.5 in TS 26.114.<br>serviceType<br>Indicates the type of application layer measurement. Value qoe indicates Quality of Experience Measurement Collection for streaming services, value qoemtsi indicates Quality of Experience Measurement Collection for MTSI.<br>qoe-Reference<br>Contains the reference of the application layer measurement.<br>recordingSessionIndication<br>Indicates that a recording of a session in the application layer has started. |

For E-UTRAN, an example of desired UE behavior for Application layer measurement reporting is described in CR 4297 (R2-2004624) as follows. A UE capable of application layer measurement reporting in RRC_CONNECTED may initiate the procedure when configured with application layer measurement, i.e. when measConfigAppLayer has been configured by E-UTRAN. Upon initiating the procedure, the UE shall:

1> if configured with application layer measurement, and SRB4 is configured, and the UE has received application layer measurement report information from upper layers:
  2> set the measReportAppLayerContainer in the MeasReportAppLayer message to the value of the application layer measurement report information;
  2> set the serviceType in the MeasReportAppLayer message to the type of the application layer measurement report information;
  2> set the qoe-Reference in the MeasReportAppLayer message to the value received from upper layer;
  2> set the recordingSessionIndication in the MeasReportAppLayer message to the value received from upper layer;
  2> submit the MeasReportAppLayer message to lower layers for transmission via SRB4.

8 Overload Detection in RAN

Overload detection is possible in RAN. In the NG-RAN, the gNB-DU can indicate to the gNB-CU its status of overload by means of the F1AP "GNB-DU STATUS INDICATION" message as described below (see 3GPP TS 38.473).

Start of Excerpts from 3GPP TS 38.473 V16.1.0

8.2.7 gNB-DU Status Indication 8.2.7.1 General

The purpose of the gNB-DU Status Indication procedure is informing the gNB-CU that the gNB-DU is overloaded so that overload reduction actions can be applied. The procedure uses non-UE associated signalling.

8.2.7.2 Successful Operation

Reproduced Herein as FIG. 14

FIG. 8.2.7.2-1: gNB-DU Status Indication Procedure

If the gNB-DU Overload Information IE in the GNB-DU STATUS INDICATION message indicates that the gNB-DU is overloaded, the gNB-CU shall apply overload reduction actions until informed, with a new GNB-DU STATUS INDICATION message, that the overload situation has ceased.

The detailed overload reduction policy is up to gNB-CU implementation.

.
.
.

9.2.1.15 GNB-DU Status Indication

This message is sent by the gNB-DU to indicate to the gNB-CU its status of overload.
Direction: gNB-DU→gNB-CU

| IE/Group Name | Presence | Range | IE type and reference | Semantics description | Criticality | Assigned Criticality |
|---|---|---|---|---|---|---|
| Message Type | M | | 9.3.1.1 | | YES | ignore |
| Transaction ID | M | | 9.3.1.23 | | YES | reject |
| gNB-DU Overload Information | M | | ENU-MERATED (overloaded, not-overloaded) | | YES | reject |

***END OF EXCERPTS FROM 3GPP TS 38.473 V16.1.0***

A similar procedure is defined in NG-RAN for the E1 interface. The gNB-CU-UP can indicate to the gNB-CU-CP its status of overload by means of the F1AP "GNB-CU-UP STATUS INDICATION" message as described below (see 3GPP TS 38.463).

Start of Excerpts from 3GPP TS 38.463 V16.1.1

8.2.8 gNB-CU-UP Status Indication

8.2.8.1 General

The purpose of the gNB-CU-UP Status Indication procedure is to inform the gNB-CU-CP that the gNB-CU-UP is overloaded so that overload reduction actions can be applied. The procedure uses non-UE associated signalling.

8.2.8.2 Successful Operation

Reproduced Herein as FIG. 15

FIG. 8.3.7.2-1: DL Data Notification Procedure: Successful Operation

The gNB-CU-UP initiates the procedure by sending the GNB-CU-UP STATUS INDICATION message to the gNB-CU-CP.

If the gNB-CU-UP Overload Information IE in the GNB-CU-UP STATUS INDICATION message indicates that the gNB-CU-UP is overloaded, the gNB-CU-CP shall apply overload reduction actions until informed, with a new GNB-CU-UP STATUS INDICATION message, that the overload situation has ceased. The detailed overload reduction policy is up to gNB-CU-CP implementation.

.
.
.

9.2.1.18 GNB-CU-UP Status Indication

This message is sent by the gNB-CU-UP to indicate to the gNB-CU-CP its status of overload.
Direction: gNB-CU-UP→gNB-CU-CP

| IE/Group Name | Presence | Range | IE type and reference | Semantics description | Criticality | Assigned Criticality |
|---|---|---|---|---|---|---|
| Message Type | M | | 9.3.1.1 | | YES | reject |
| Transaction ID | M | | 9.3.1.53 | | YES | reject |
| gNB-CU-UP Overload Information | M | | ENU-MERATED (overloaded, not-overloaded) | | YES | reject |

***END OF EXCERPTS FROM 3GPP TS 38.463 V16.1.1***

A similar procedure is defined for X2 interface. The en-gNB can indicate to the eNB its status of overload by means of the X2AP "GNB STATUS INDICATION" message as described below (see 3GPP TS 36.423).

Start of Excerpts from 3GPP TS 36.423 V16.1.0

8.7.17 gNB Status Indication

8.7.17.1 General

The purpose of the gNB Status Indication procedure is to inform the eNB that the en-gNB is overloaded so that overload reduction actions can be applied. The procedure uses non-UE associated signalling.

8.7.17.2 Successful Operation

Reproduced Herein as FIG. 16

FIG. 8.7.17.2-1: GNB Status Indication Procedure, Successful Operation

If the gNB Overload Information IE in the GNB STATUS INDICATION message is set to "overloaded", the eNB shall apply overload reduction actions until it receives a subsequent GNB STATUS INDICATION message with gNB Overload Information IE set to "not-overloaded".

The detailed overload reduction policy is up to eNB implementation.

If case of network sharing with multiple cell ID broadcast with shared X2-C signalling transport, as specified in TS 36.300 [15], the GNB STATUS INDICATION message shall contain the Interface Instance Indication IE to identify the corresponding interface instance.

.

.

.

9.1.4.27 gNB Status Indication

This message is sent by the en-gNB to indicate to the eNB its status of overload.

Direction: en-gNB→eNB.

| IE/Group Name | Presence | Range | IE type and reference | Semantics description | Criticality | Assigned Criticality |
|---|---|---|---|---|---|---|
| Message Type | M | | 9.2.13 | | YES | ignore |
| gNB Overload Information | M | | ENUMERATED (overloaded, not-overloaded, . . . ) | | YES | ignore |
| Interface Instance Indication | O | | 9.2.143 | | YES | reject |

***END OF EXCERPTS FROM 3GPP TS 36.423 V16.1.0***

9 Handling QoE Measurement Under Overload RAN Conditions

As part of LTE specification 3GPP TS 28.405, RAN nodes are allowed to temporarily stop and restart the QoE measurement reporting when an overload situation is observed at RAN nodes. Here is an excerpt from 3GPP TS 28.405.

Start of Excerpts from 3GPP TS 28.405 V2.0.0

4.2.4 Temporary Stop and Restart of QoE Information Reporting During RAN Overload in LTE In case of overload in RAN, the eNB may temporarily stop the reporting from the UE by send the RRCConnectionReconfiguration message [8] to relevant UEs. The RRC-ConnectionReconfiguration message is including measConfigAppLayer set to temporarily stop application layer measurement reporting in otherConfig [8]. The Access stratum sends +CAPPLEVMC AT command [5] to the application with the temporary stop request. The application stops the reporting and stops recording further information when the data in the reporting container is used. Then the recorded data is kept until it is reported or when the UE request session is ended.

When the overload situation in RAN is ended the eNB restart the reporting from the UE by send the RRCConnectionReconfiguration message [8] to relevant UEs. The RRC-ConnectionReconfiguration message is including measConfigAppLayer set to restart application layer measurement reporting in other (Config [8]. The Access stratum sends +CAPPLEVMC AT command [5] to the application with the restart request. The application restarts the reporting and recording if it was stopped.

End of Excerpts from 3GPP TS 28.405 V2.0.0

SUMMARY

Systems and methods are disclosed herein for Quality of Experience (QoE) measurements handling at overload in a Radio Access Network (RAN) of a cellular communications system. In one embodiment, a method performed by a first RAN node for handling QoE measurement configuration and/or reporting during RAN overload comprises performing one or more actions related to one or more aspects of QoE measurement configuration, QoE measurement reporting, or both QoE measurement configuration and QoE measurement reporting that mitigate an RAN overload condition. In one embodiment, performing the one or more actions comprises performing one or more actions related to transfer of one or more aspects of QoE measurement configuration from the first RAN node to a second RAN node, transfer of one or more aspects of QoE measurement reporting from the first RAN node to the second RAN node, or both. In this manner, delivery of QoE measurement report(s) via other (non-overloaded) RAN nodes is enabled. This not only reduces the risk of overloading after restoring the QoE mechanism after pausing QoE measurement reporting, but also enables on-time delivery of QoE measurement reports that, in turn, enable proper optimization and reconfiguration of network resources for critical type of services.

In one embodiment, the first and second RAN nodes are of the same Radio Access Technology (RAT). In another embodiment, the first and second RAN nodes are of different RATs.

In one embodiment, performing one or more actions related to transfer of one or more aspects of QoE measurement configuration from the first RAN node to a second RAN node, transfer of one or more aspects of QoE measurement reporting from the first RAN node to the second RAN node, or both comprises: performing one or more actions to transfer responsibility of sending QoE measurement configuration(s) for one or more UEs from the first RAN node to the second RAN node; performing one or more actions to transfer responsibility of sending QoE measurement configuration update(s) for one or more UEs from the first RAN node to the second RAN node; or performing both one or more actions to transfer responsibility of sending QoE measurement configuration(s) for one or more UEs from the first RAN node to the second RAN node and one or more actions to transfer responsibility of sending QoE measurement configuration update(s) for one or more UEs from the first RAN node to the second RAN node.

In one embodiment, performing one or more actions related to transfer of one or more aspects of QoE measurement configuration from the first RAN node to a second RAN node, transfer of one or more aspects of QoE measurement reporting from the first RAN node to the second RAN node, or both comprises performing one or more actions to transfer responsibility of receiving QoE measurement report(s) from one or more UEs from the first RAN node to the second RAN node.

In one embodiment, the second RAN node is selected as part of a mobility procedure.

In one embodiment, for a UE served by an Integrated Access and Backhaul (IAB) node, performing (1802) one or more actions related to transfer of one or more aspects of QoE measurement configuration from the first RAN node to a second RAN node, transfer of one or more aspects of QoE measurement reporting from the first RAN node to the second RAN node, or both comprises: changing a backhaul path used for delivery of QoE measurement configuration(s) for the UE; changing a backhaul path used for delivery of QoE measurement reports for the UE; or changing a backhaul path used for delivery of QoE measurement configuration(s) and QoE measurement reports for the UE.

In one embodiment, performing the one or more actions comprises performing one or more actions either responsive to determining that a RAN overload condition exists or prior to a RAN overload condition. In one embodiment, the RAN overload condition is an entire RAN overload condition or a partial RAN overload condition.

In one embodiment, the method further comprises sending, to a UE, an indication of how the UE is to operate with respect to QoE measurement and/or QoE reporting in the event of a RAN overload condition.

In another embodiment, a method performed by a first RAN node for handling QoE measurement configuration and/or reporting during RAN overload comprises performing one or more actions related to one or more aspects of QoE measurement configuration, QoE measurement reporting, or both QoE measurement configuration and QoE measurement reporting that mitigate an RAN overload condition. In one embodiment, performing the one or more actions comprises modifying QoE measurement configurations, modifying QoE reporting attributes, or modifying both QoE measurement configurations and QoE reporting attributes. In one embodiment, performing the one or more actions comprises: stopping, delaying, or pausing pending QoE measurement configurations for one or more services; stopping, delaying, or pausing pending QoE measurement configurations for one or more UEs; or stopping, delaying, or pausing pending QoE measurement configurations for one or more services and stopping, delaying, or pausing pending QoE measurement configurations for one or more UEs.

In one embodiment, performing the one or more actions comprises changing the configuration of one or more or all UEs configured for QoE measurement in a respective cell from autonomous QoE measurement reporting to request-based QoE measurement reporting.

In one embodiment, performing the one or more actions comprises instructing one or more UEs to store QoE measurements up to a certain limit, the certain limit defined in terms of size, time, or number of reports.

In one embodiment, performing the one or more actions comprises sending an overload indication to another network entity.

In another embodiment, a method performed by a first RAN node for handling QoE measurement configuration and/or reporting during RAN overload comprises performing one or more actions related to one or more aspects of QoE measurement configuration, QoE measurement reporting, or both QoE measurement configuration and QoE measurement reporting that mitigate an RAN overload condition. The first RAN node is an IAB donor node, and performing the one or more actions comprises performing the one or more actions responsive to RAN overload on one or more intermediate IAB nodes between the IAB donor node and one or more UEs.

In one embodiment, performing the one or more actions comprises changing a route on which QoE measurement configurations are carried, a route on which QoE measurement reports are carried, or a route on which both QoE measurement configurations and QoE measurement reports are carried.

In another embodiment, a method performed by a first RAN node for handling QoE measurement configuration and/or reporting during RAN overload comprises performing one or more actions related to one or more aspects of QoE measurement configuration, QoE measurement reporting, or both QoE measurement configuration and QoE measurement reporting that mitigate an RAN overload condition. In one embodiment, performing the one or more actions comprises performing one or more actions related to transfer of one or more aspects of QoE measurement configuration from a first resource of the first RAN node to a second resource of the first RAN node, transfer of one or more aspects of QoE measurement reporting from a first resource of the first RAN node to a second resource of the first RAN node, or both.

In another embodiment, a method performed by a first RAN node for handling QoE measurement configuration and/or reporting during RAN overload comprises receiving, from a UE, an indication that buffered data at the UE for uplink transmission comprises a QoE measurement report and performing one or more actions related to one or more aspects of QoE measurement configuration, QoE measurement reporting, or both QoE measurement configuration and QoE measurement reporting that mitigate an RAN overload condition. Performing the one or more actions comprises, responsive to receiving the indication that the buffered data at the UE for uplink transmission comprises a QoE measurement report, performing a deviation action, the deviation action being an action that deviates from a normal action taken by the first RAN node when buffered data at the UE for uplink transmission does not comprise a QoE measurement report.

In one embodiment, the deviation action comprises: ignoring an associated scheduling request; transmitting a downlink control information to the UE that informs the UE that no uplink transmission resources will be allocated for transmission of the QoE measurement report; transmitting a downlink control information to the UE that instructs the UE to refrain from requesting uplink transmission resources for the purpose of transmitting QoE measurement reports for a certain time period or until further notice; transmitting a downlink control information to the UE that instructs the UE to stop, delay, or pause QoE measurement reporting; transmitting a downlink control information to the UE that instructs the UE to store QoE reports; transmitting a downlink control information to the UE that instructs the UE to enter a mode of operation in which the UE sends QoE measurement reports upon request; transmitting a Medium Access Control (MAC) Control Element (CE) to the UE that instructs the UE to stop, delay, or pause QoE measurement reporting; transmitting a MAC CE to the UE that instructs the UE to store QoE measurement reports; transmitting a MAC CE to the UE that instructs the UE to enter a mode of operation in which the UE sends QoE measurement reports upon request; transmitting a Radio Resource Control (RRC) message to the UE that instructs the UE to stop, delay, or pause QoE measurement reporting; transmitting a RRC message to the UE that instructs the UE to store QoE measurement reports; transmitting a RRC message to the UE that instructs the UE to enter a mode of operation in which the UE sends QoE measurement reports upon request; or transmitting a downlink control channel to the UE that contains an uplink grant and an indication to the UE that the UE is not allowed to utilize the uplink grant for transmission of the QoE measurement report.

Corresponding embodiments of a first RAN node for handling QoE measurement configuration and/or reporting during RAN overload are also disclosed.

Embodiments of a method performed by a second RAN node for handling QoE measurement configuration and/or reporting during RAN overload are also disclosed. In one embodiment, the method comprises performing one or more actions related to transfer of one or more aspects of QoE measurement configuration from a first RAN node to the second RAN node, transfer of one or more aspects of QoE measurement reporting from the first RAN node to the second RAN node, or both.

In one embodiment, the first RAN node and the second RAN node are of the same RAT. In another embodiment, the first RAN node and the second RAN node are of different RATs.

In one embodiment, performing the one or more actions comprises receiving, from the first RAN node, a request for transfer of responsibility of sending QoE measurement configuration(s) from the first RAN node to the second RAN node, transfer of responsibility of sending QoE measurement configuration update(s) for one or more UEs from the first RAN node to the second RAN node, or both.

In one embodiment, performing the one or more actions comprises receiving, from the first RAN node, a request to transfer responsibility of receiving QoE measurement report (s) from one or more UEs from the first RAN node to the second RAN node.

In one embodiment, the second RAN node is selected as part of a mobility procedure.

In one embodiment, the method further comprises performing one or more actions related to transfer of one or more aspects of QoE measurement configuration back from the second RAN node to the first RAN node, transfer of one or more aspects of QoE measurement reporting back from the second RAN node to the first RAN node, or both.

Corresponding embodiments of a second RAN node are also disclosed.

Embodiments of a method performed by a wireless communication device in relation to handling QoE measurement configuration and/or reporting during RAN overload are also disclosed. In one embodiment, the method comprises receiving, from a first RAN node, a QoE measurement configuration that comprises an explicit setting or an index to a setting to be used in case of RAN overload, receiving an indication of presence of RAN overload and/or a different QoE measurement configuration or an index to a different QoE measurement configuration, either from the first RAN node or a second RAN node, performing a reconfiguration related to QoE measurement and/or QoE measurement reporting responsive to the explicit setting and/or the received indication of the presence of RAN overload and/or the different QoE measurement configuration, and suspending or delaying backlogged QoE measurement reports while aware of the presence of RAN overload.

Corresponding embodiments of a wireless communication device are also disclosed.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1:
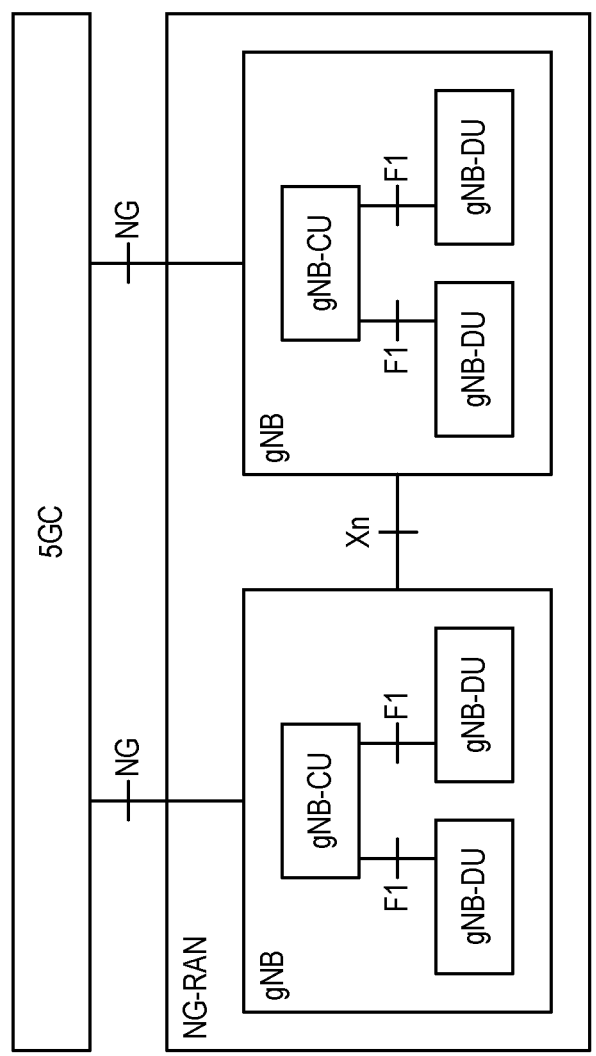
FIG. 1 is a reproduction of FIGS. 6.1-2 of Third Generation Partnership Project (3GPP) Technical Specification (TS) 38.401 V16.1.0.
Figure 2:
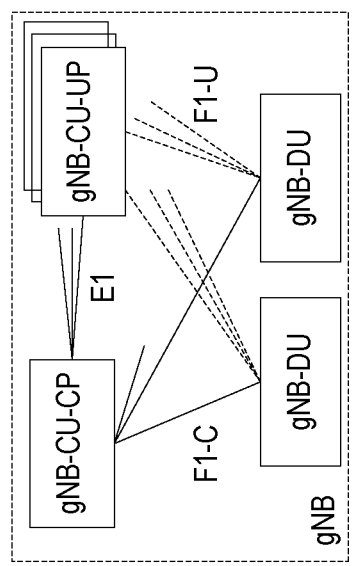
FIG. 2 is a reproduction of FIG. 6.1.2-1 of 3GPP TS 38.401 V16.1.0.
Figure 3:
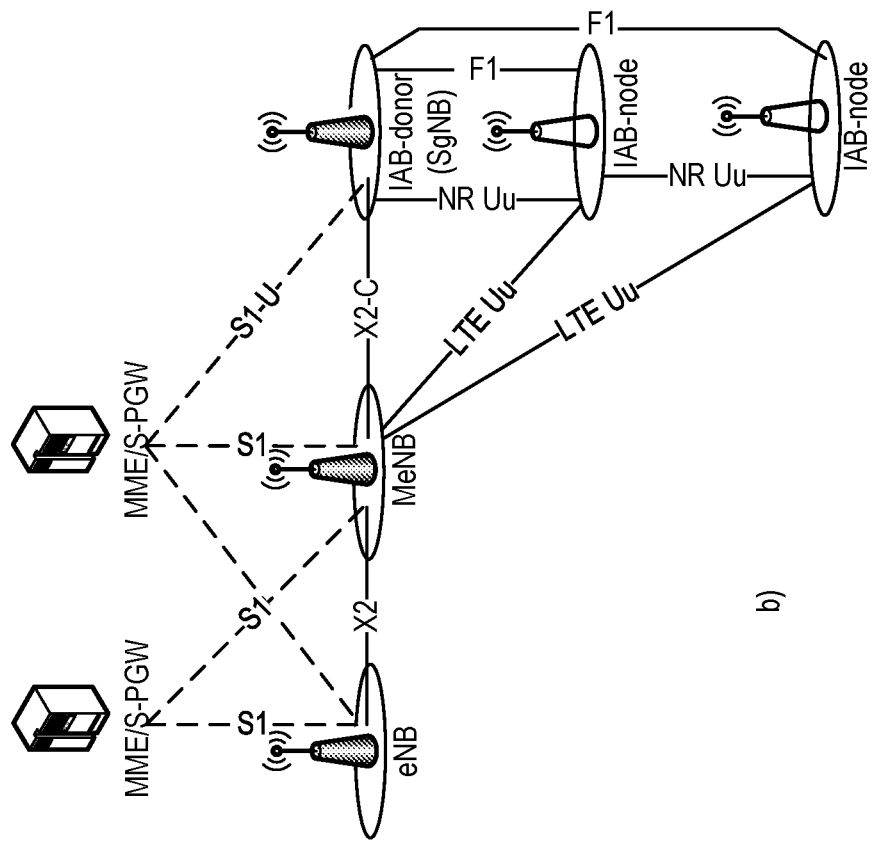
FIG. 3 illustrates the overall architecture of Integrated Access and Backhaul (IAB) for both New Radio (NR) and Long Term Evolution (LTE)
Figure 3:
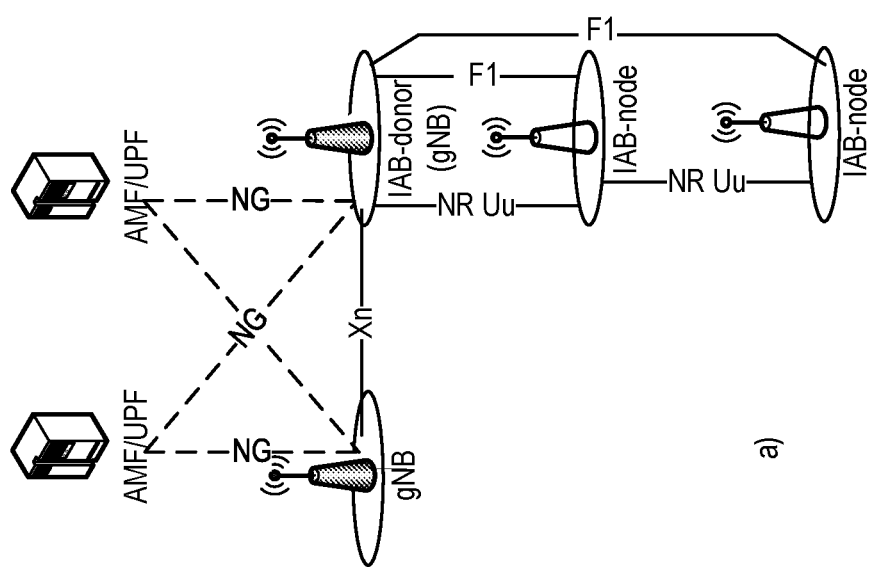
Figure 4:
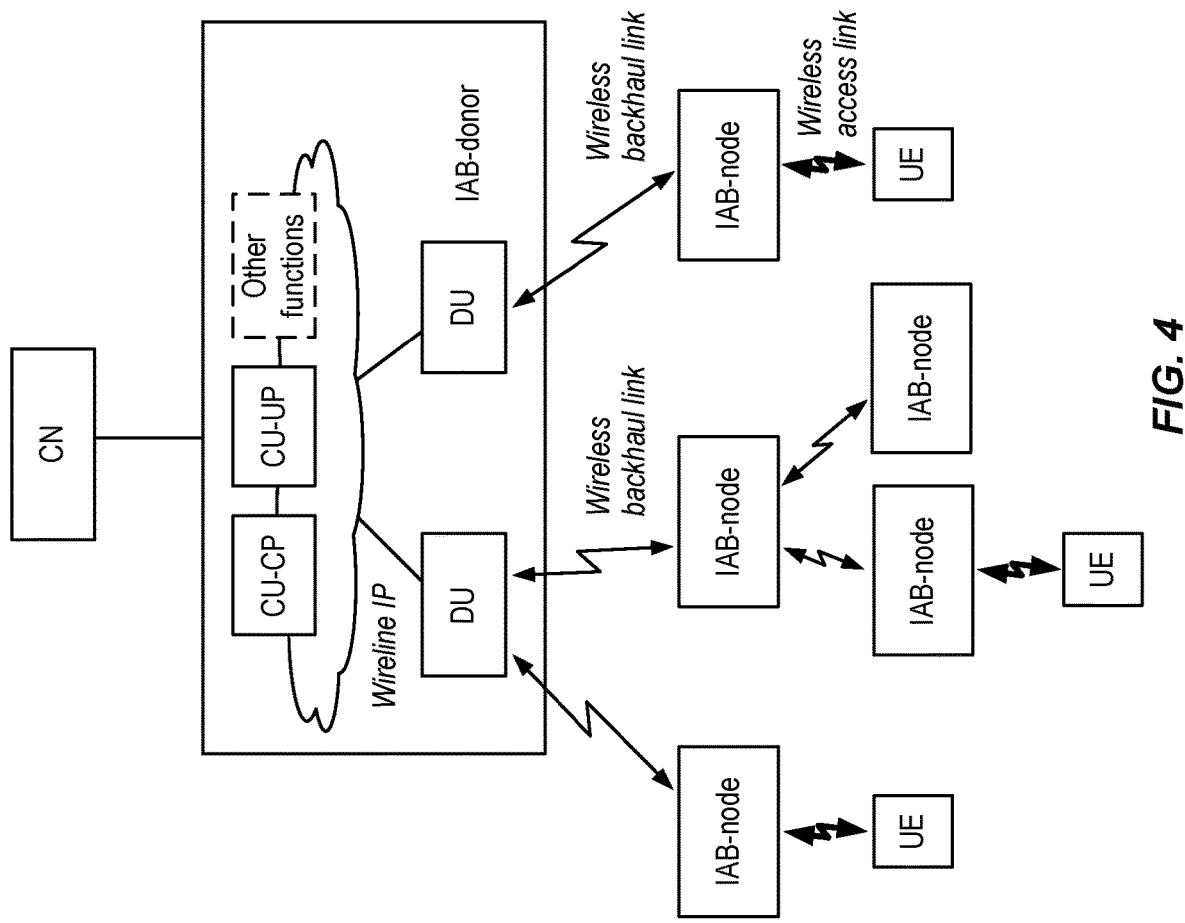
FIG. 4 is a reference diagram for the IAB architecture.
Figure 5:
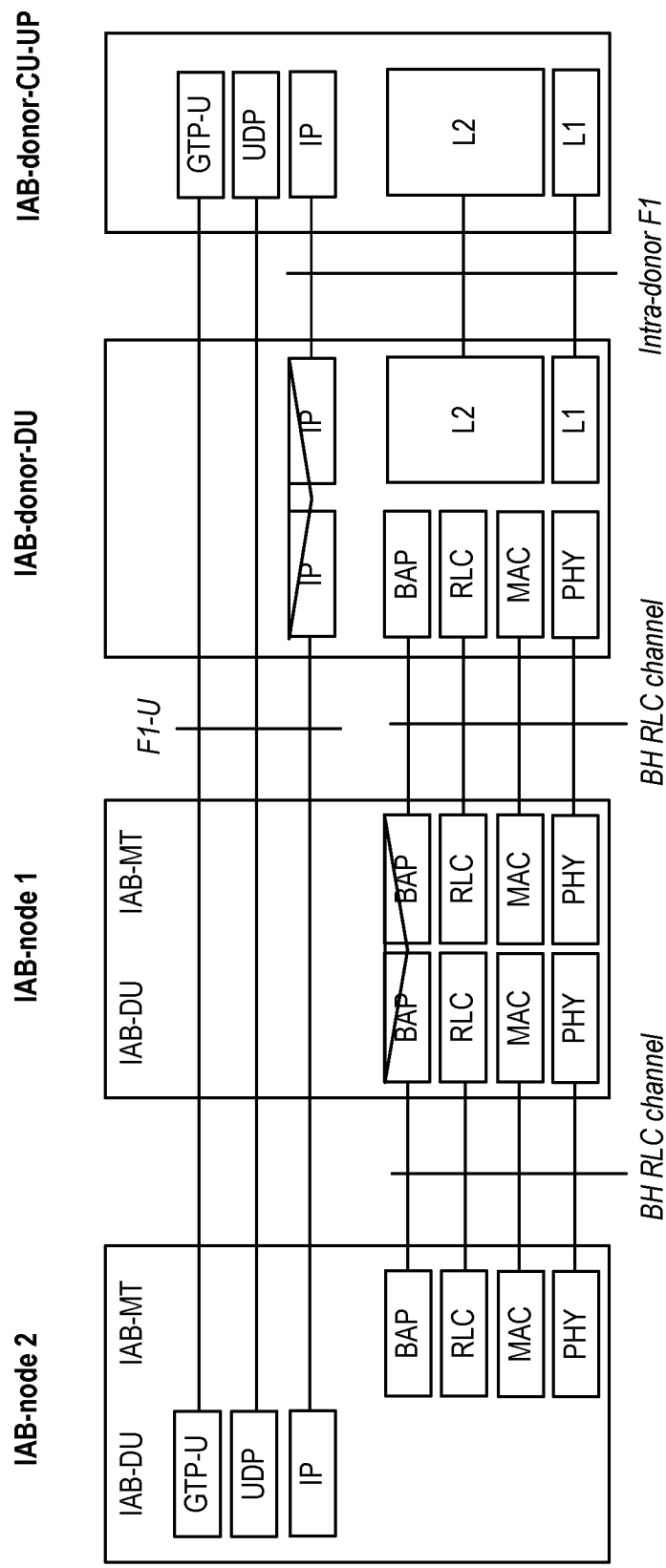
FIG. 5 shows the protocol stack for the F1-U interface between an IAB Distributed Unit (IAB-DU) and a User Plane (UP) part of a IAB donor Central Unit (CU) (IAB-donor-CU-UP)
Figure 6:
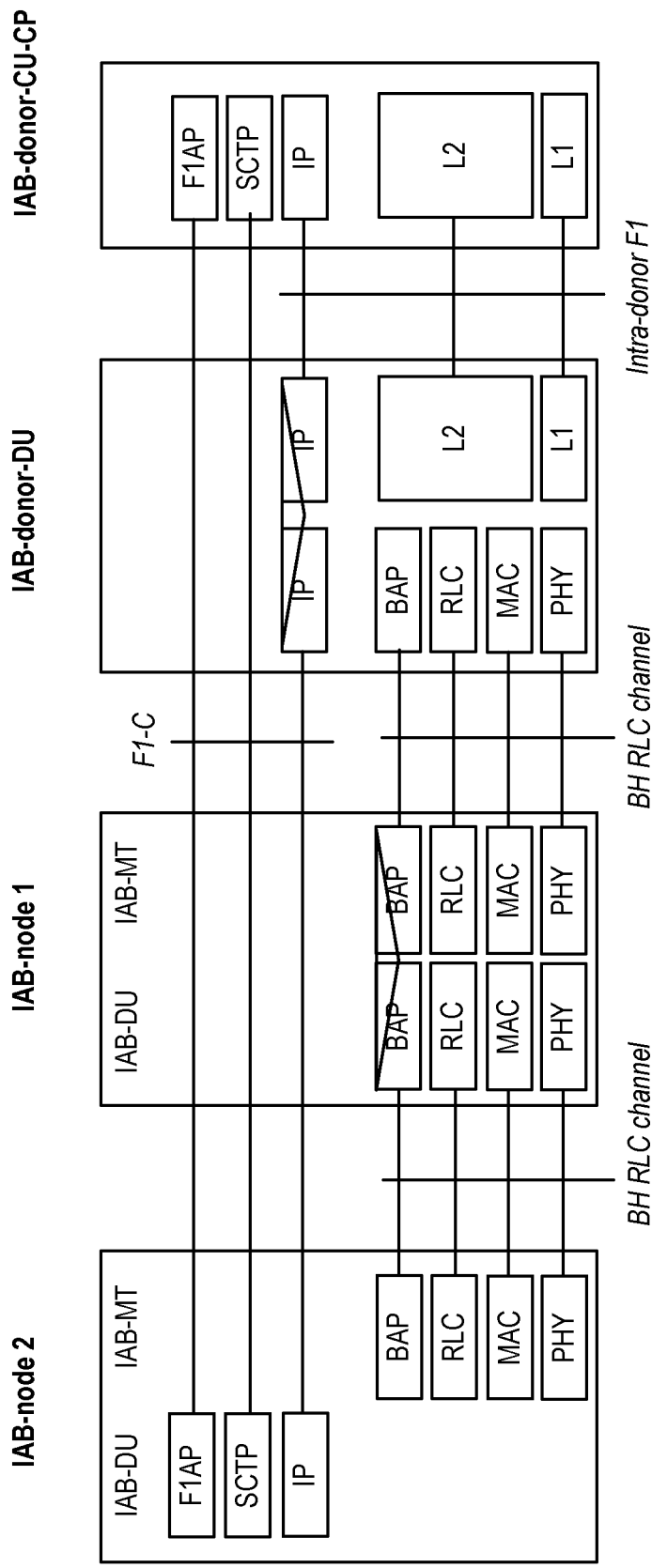
FIG. 6 shows the protocol stack for the F1-C interface between IAB-DU and the IAB-donor-CU-CP.
Figure 7:
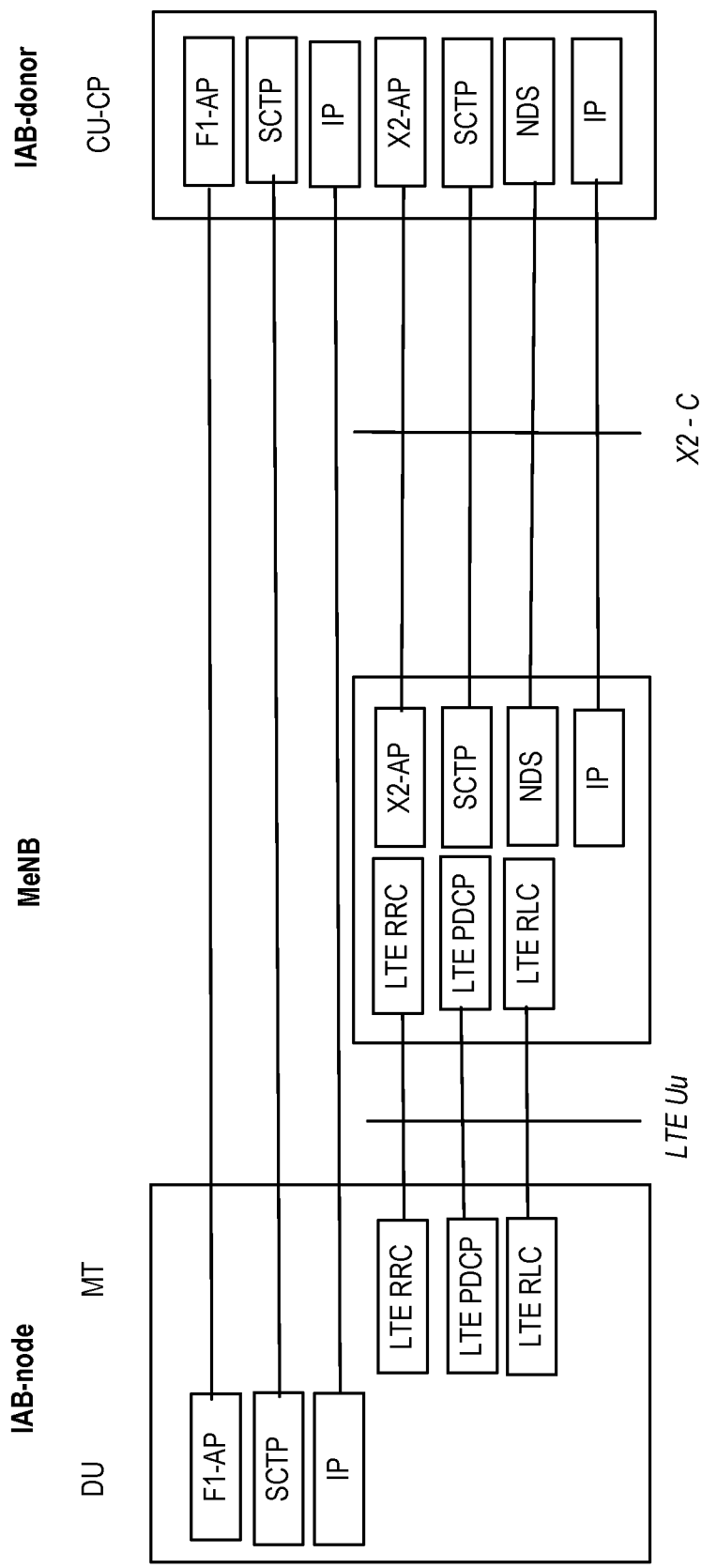
FIG. 7 shows the protocol stack for the F1-C interface between IAB-DU and the IAB-donor-CU-CP, when the F1-C traffic is transmitted via the Master evolved Node B (MeNB)
Figure 9:
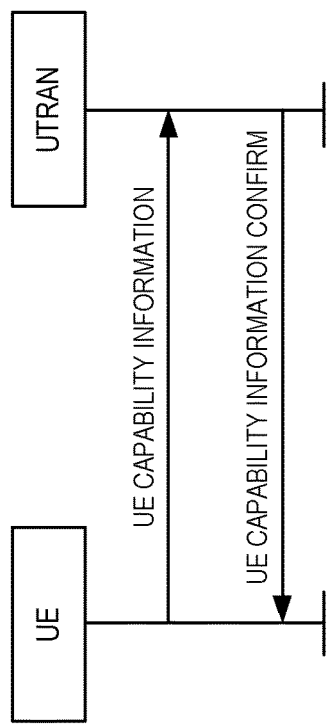
FIG. 9 illustrates how the UE can provide its capability using the "UE Capability Information" Radio Resource Control (RRC) message.
Figure 8:
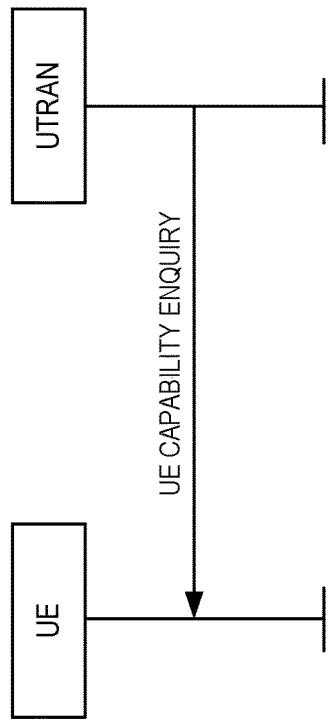
FIG. 8 illustrates how the Universal Terrestrial Radio Access Network (UTRAN) can request the User Equipment (UE) to report its capability via a UE capability enquiry procedure, as specified in 3GPP TS 25.331.
Figure 10:
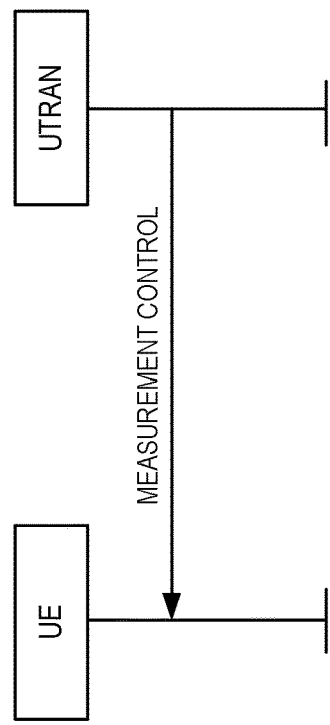
FIG. 10 illustrates how the UTRAN can send a "Measurement Control" RRC message containing "Application layer measurement configuration" to configure Quality of Experience (QoE) measurement in the UE.
Figure 11:
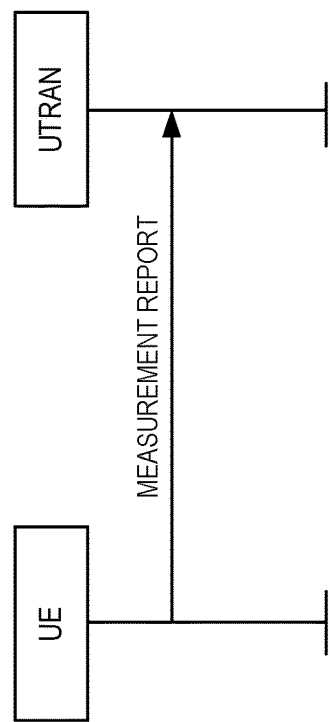
FIG. 11 illustrates how the UE can send QoE measurement results via the UTRAN to a Collecting Entity using the "Measurement Report" RRC message and including the "Application layer measurement reporting" Information Element (IE)
Figure 13:
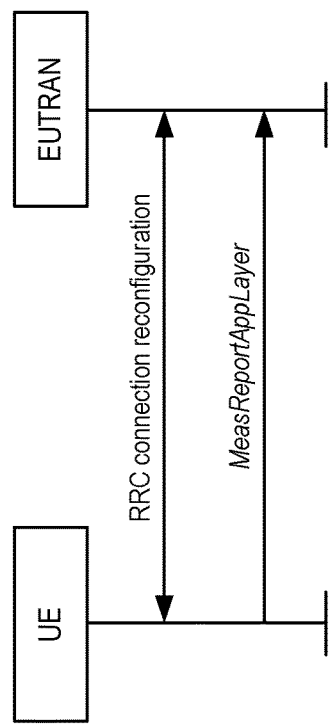
FIG. 13 illustrates the "Application layer measurement reporting" procedure described in 3GPP TS 36.331, the purpose of which is to inform the E-UTRAN about an application layer measurement report.
Figure 12:
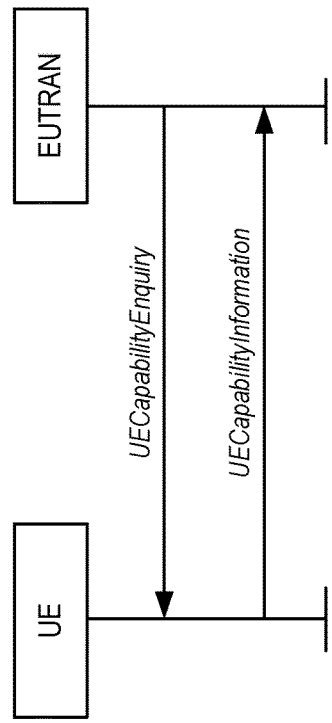
FIG. 12 illustrates the UE capability transfer procedure in Evolved UTRAN (E-UTRAN)
Figure 15:
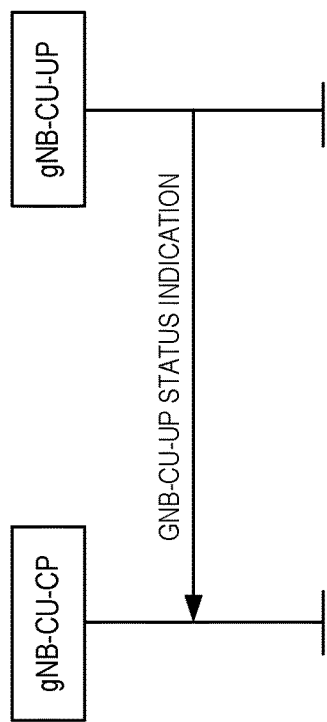
FIG. 15 is a reproduction of FIG. 8.3.7.2-1 of 3GPP TS 38.463 V16.1.1.
Figure 14:
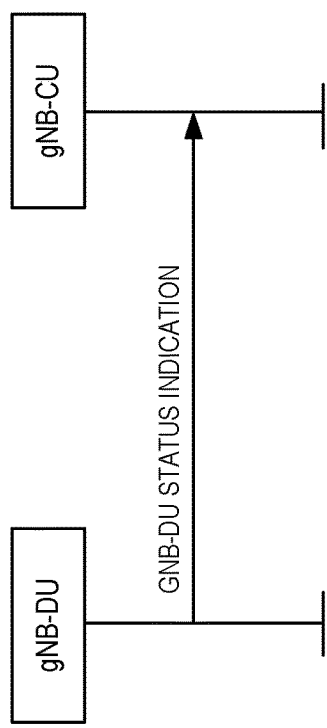
FIG. 14 is a reproduction of FIG. 8.2.7.2-1 of 3GPP TS 38.473 V16.1.0.
Figure 16:
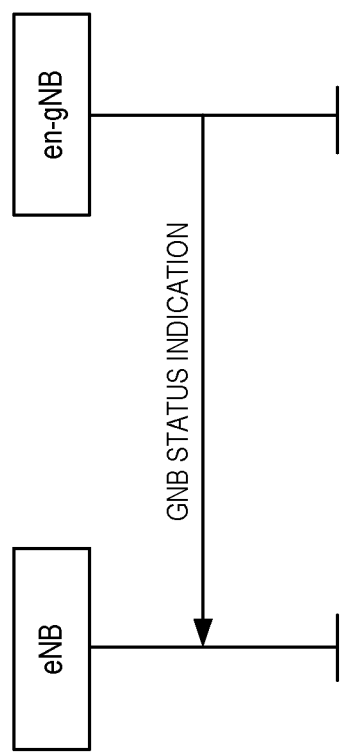
FIG. 16 is a reproduction of FIG. 8.7.17.2-1 of 3GPP TS 36.423 V16.1.0.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

Radio Node: As used herein, a "radio node" is either a radio access node or a wireless communication device.

Radio Access Node: As used herein, a "radio access node" or "radio network node" or "radio access network node" or "RAN node" is any node in a Radio Access Network (RAN) of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), a relay node, a network node that implements part of the functionality of a base station (e.g., a network node that implements a gNB Central Unit (gNB-CU) or a network node that implements a gNB Distributed Unit (gNB-DU)) or a network node that implements part of the functionality of some other type of radio access node.

Core Network Node: As used herein, a "core network node" is any type of node in a core network or any node that implements a core network function. Some examples of a core network node include, e.g., a Mobility Management Entity (MME), a Packet Data Network Gateway (P-GW), a Service Capability Exposure Function (SCEF), a Home Subscriber Server (HSS), or the like. Some other examples of a core network node include a node implementing an Access and Mobility Management Function (AMF), a User Plane Function (UPF), a Session Management Function (SMF), an Authentication Server Function (AUSF), a Network Slice Selection Function (NSSF), a Network Exposure Function (NEF), a Network Function (NF) Repository Function (NRF), a Policy Control Function (PCF), a Unified Data Management (UDM), or the like.

Communication Device: As used herein, a "communication device" is any type of device that has access to an access network. Some examples of a communication device include, but are not limited to: mobile phone, smart phone, sensor device, meter, vehicle, household appliance, medical appliance, media player, camera, or any type of consumer electronic, for instance, but not limited to, a television, radio, lighting arrangement, tablet computer, laptop, or Personal Computer (PC). The communication device may be a portable, hand-held, computer-comprised, or vehicle-mounted mobile device, enabled to communicate voice and/or data via a wireless or wireline connection.

Wireless Communication Device: One type of communication device is a wireless communication device, which may be any type of wireless device that has access to (i.e., is served by) a wireless network (e.g., a cellular network). Some examples of a wireless communication device include, but are not limited to: a User Equipment device (UE) in a 3GPP network, a Machine Type Communication (MTC) device, and an Internet of Things (IoT) device. Note that a wireless communication device is also referred to herein as a "terminal equipment". As such, these two terms are used interchangeably in this description. Such wireless communication devices may be, or may be integrated into, a mobile phone, smart phone, sensor device, meter, vehicle, household appliance, medical appliance, media player, camera, or any type of consumer electronic, for instance, but not limited to, a television, radio, lighting arrangement, tablet computer, laptop, or PC. The wireless communication device may be a portable, hand-held, computer-comprised, or vehicle-mounted mobile device, enabled to communicate voice and/or data via a wireless connection.

Network Node: As used herein, a "network node" is any node that is either part of the RAN or the core network of a cellular communications network/system.

Overload: As used herein, term "overload" encompasses both the RAN node-level overload, where an entire RAN node is overloaded, or a partial overload where one or more network resources used for data transmission within a RAN node are overloaded.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

There currently exist certain challenge(s). In case of RAN overload, a delay or a reject is expected for new Quality of Experience (QoE) measurement configurations and/or incoming QoE measurement reports. In addition, the RAN node may temporarily suspend some of the already activated QoE measurements for some UEs. This can be a problem for critical services in which lacking QoE measurements and corresponding optimization may cause inefficiency in services. This problem may be even more severe in case any action is required to be taken by the RAN node in network implementations where QoE metrics may be used to steer the RAN behavior.

Certain aspects of the present disclosure and their embodiments may provide solutions to the aforementioned or other challenges. Embodiments of methods are disclosed herein for handling QoE measurement configuration and reporting in case of overload in the RAN.

Embodiments of a method performed by a first RAN node for handling QoE measurement in overloaded RAN condition are disclosed. In one embodiment, the method comprises at least one of the following actions (or a combination of them) that may be used when one or more QoE measurements are configured for at least one UE at the same time when RAN overload is detected:

the first RAN node transferring to a second RAN node within the same Radio Access Technology (RAT) the responsibility of sending QoE measurement configuration(s), or QoE measurement configuration update(s), for one or multiple UEs;

the first RAN node transferring to a second RAN node in another RAT the responsibility of sending QoE measurement configuration(s) for one or multiple UEs;

the first RAN node transferring to a second RAN node within the same RAT the responsibility of receiving QoE measurement report(s) from one or multiple UE(s);

the first RAN node transferring to a second RAN node in another RAT the responsibility of receiving QoE measurement report(s) from one or multiple UE(s);

selecting the second RAN node or receiving an indication of the selected second RAN node, where the second RAN node may be selected as part of a mobility scenario(s) (e.g., such as handover, cell change, release with redirect);

for UEs served by Integrated Access and Backhaul (IAB) nodes, changing the backhaul path used for delivery of QoE measurement configuration(s) and/or reports for one or multiple UE(s);

for overload in the resources used for delivering of QoE measurement configuration(s) and/or reports (i.e., partial overload of a RAN node, as defined below), switching the responsibility for QoE measurement configuration(s), QoE measurement configuration update(s), and/or QoE report reception to another set of resources that are not overloaded;

modifying QoE measurement configurations and QoE reporting attributes;

This may include aspects such as suspending or resuming the QoE reporting, changing the amount of QoE reporting per second, changing the maximum QoE report size, indicating a different cell towards which the UE can send the QoE reporting. Such modification can be activated, e.g., based on a pre-configured (e.g., default or semi-static) setting or dynamically by means of dedicated layer 3 (e.g., Radio Resource Control (RRC)) and/or layer 2 (e.g., Medium Access Control (MAC)) signaling.

stopping, delaying, or pausing (e.g., in a stepwise approach) pending QoE measurement configurations for multiple services and/or multiple UEs;

when using the stepwise approach, the steps may be based, e.g., on pre-defined rules or configuration setting such as service type, service priority, Fifth Generation (5G) Quality of Service (QOS) Indicator (5QI), radio related thresholds, preemption capability, preemption vulnerability;

when the RAN overload condition is solved, reverting to a normal (non-overload) situation may follow a stepwise approach;

changing the configuration of one or more or all RRC_CONNECTED UES configured for QoE measurement in the cell from autonomous QoE measurement reporting to request-based QoE measurement reporting (i.e., reporting on request from the network, e.g. using a solicitation mechanism).

UE storing QoE measurements up to a certain limit. The limit could, e.g., be defined in size (number of bytes), time, number of reports etc.;

sending an indication from overloaded RAN node (the first RAN node) to MME/AMF and/or OAM, indicating the overload condition at the RAN node. AMF or OAM may use this indication to avoid selecting overloaded RAN nodes for QoE measurement purposes.

sending a second indication from overloaded RAN node (the first RAN node) to the MME/AMF and/or OAM, indicating that overload condition at RAN node is ceased. MME/AMF or OAM may use this indication to select the RAN node for QoE measurement purposes.

Certain embodiments may provide one or more of the following technical advantage(s). Currently and as part of QoE suspension mechanism at overload condition, a wireless terminal already configured with QoE measurement configuration may suspend sending QoE measurement report to the RAN node, which may cause a backlog of QoE measurement reports received from the application (if application continues performing the measurement). Hence in the existing solution, it may happen that UEs overload the RAN nodes again by sending the backlogged QoE measurements once the RAN node reactivates/restarts the QoE reporting mechanism. Embodiments of the solution(s) disclosed herein enable the delivery of QoE measurement report(s) via other (non-overload) RAN nodes. These embodiments not only reduce the risk of overloading after restoring the QoE mechanism, but also enable on-time delivery of QoE measurement reports that, in turn, enable proper optimization and reconfiguration of network resources for critical type of services.

Embodiments of the solution(s) disclosed herein provide a network operator with tools to manage, in a flexible manner, QoE measurement configuration and reporting in case of RAN overload.

Embodiments of the solution(s) disclosed herein enable network operators to configure QoE measurements and retrieve QoE reports and by that keep control of Service Level Agreements levels even under high RAN load condition.

The proposed solution(s) described herein introduce methods to handle QoE measurement configuration and reporting in case of overload in the RAN.

Figure 17:
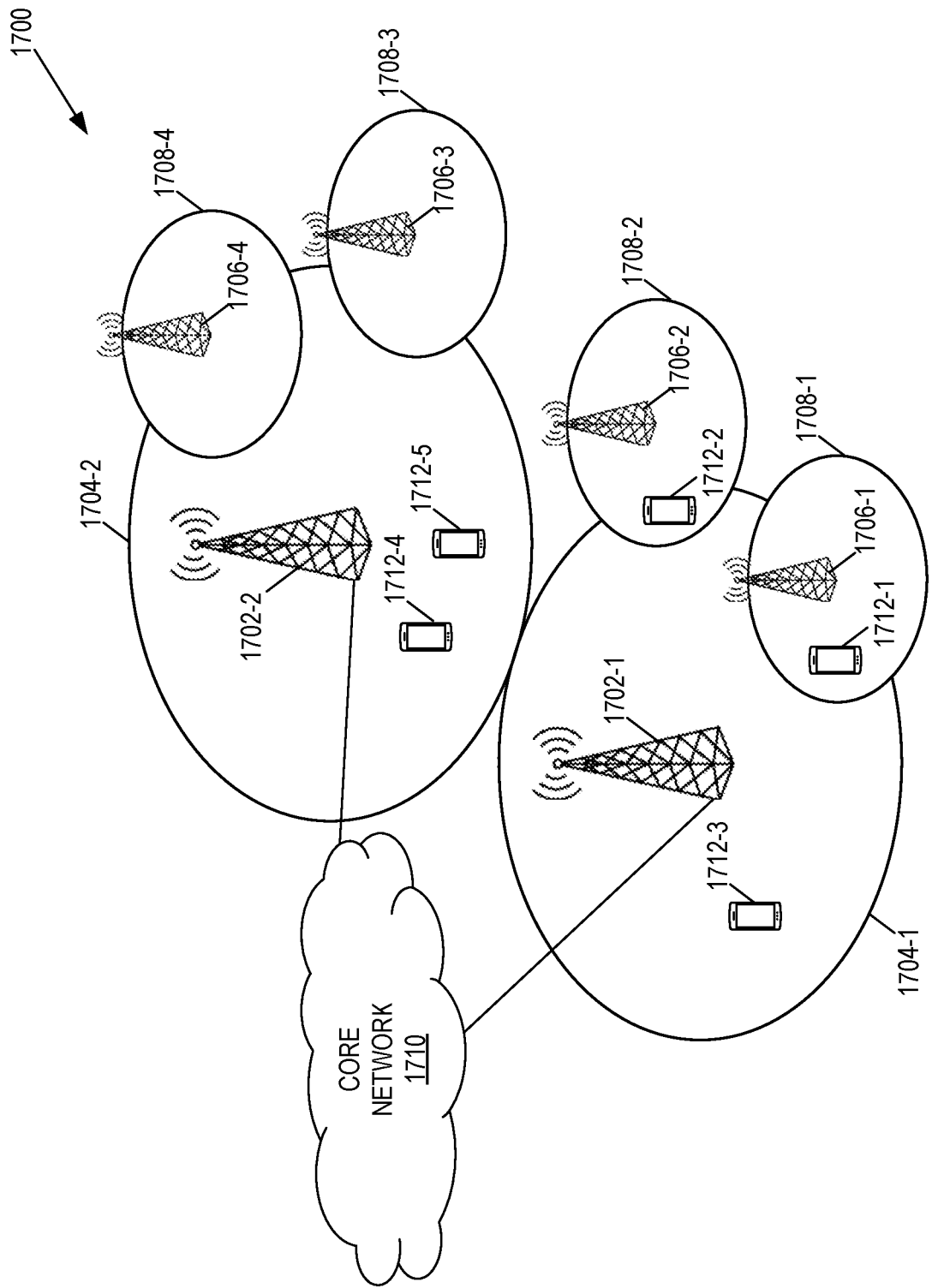
FIG. 17 illustrates one example of a cellular communications system in which embodiments of the present disclosure may be implemented.

FIG. 17 illustrates one example of a cellular communications system 1700 in which embodiments of the present disclosure may be implemented. In the embodiments described herein, the cellular communications system 1700 is a 5G system (5GS) including a Next Generation RAN (NG-RAN) and a 5G Core (5GC), an Evolved Packet System (EPS) including a Universal Terrestrial Radio Access Network (UTRAN) or Evolved UTRAN (E-UTRAN) and an Evolved Packet Core (EPC), or a combination thereof. In this example, the RAN includes base stations 1702-1 and 1702-2, which in the 5GS include NR base stations (gNBs) and optionally next generation eNBs (ng-eNBs) (e.g., LTE RAN nodes connected to the 5GC) and in the (E-)UTRAN are referred to as eNBs, controlling corresponding (macro) cells 1704-1 and 1704-2. The base stations 1702-1 and 1702-2 are generally referred to herein collectively as base stations 1702 and individually as base station 1702. Likewise, the (macro) cells 1704-1 and 1704-2 are generally referred to herein collectively as (macro) cells 1704 and individually as (macro) cell 1704. The RAN may also include a number of low power nodes 1706-1 through 1706-4 controlling corresponding small cells 1708-1 through 1708-4. The low power nodes 1706-1 through 1706-4 can be small base stations (such as pico or femto base stations) or Remote Radio Heads (RRHs), or the like. Notably, while not illustrated, one or more of the small cells 1708-1 through 1708-4 may alternatively be provided by the base stations 1702. The low power nodes 1706-1 through 1706-4 are generally referred to herein collectively as low power nodes 1706 and individually as low power node 1706. Likewise, the small cells 1708-1 through 1708-4 are generally referred to herein collectively as small cells 1708 and individually as small cell 1708. The cellular communications system 1700 also includes a core network 1710, which in the 5G System (5GS) is referred to as the 5GC and in the EPS is referred to as the EPC. The base stations 1702 (and optionally the low power nodes 1706) are connected to the core network 1710.

The base stations 1702 and the low power nodes 1706 provide service to wireless communication devices 1712-1 through 1712-5 in the corresponding cells 1704 and 1708. The wireless communication devices 1712-1 through 1712-5 are generally referred to herein collectively as wireless communication devices 1712 and individually as wireless communication device 1712. In the following description, the wireless communication devices 1712 are oftentimes UEs and as such sometimes referred to herein as UEs or UEs 1712, but the present disclosure is not limited thereto.

Now, a description of some particular aspects of the solution(s) described herein are described. The proposed solution(s) consider the following:

a first RAN node (e.g., a first base station 1702 or some RAN node that implements part of the functionality a base station), which can be any of gNB, eNB, en-gNB, ng-eNB, gNB-CU-CP, gNB-CU-CP, gNB-DU, eNB-CU-CP, eNB-CU-CP, eNB-DU, IAB-node;

a second RAN node (e.g., a second base station 1702 or some RAN node that implements part of the functionality a base station), which can be any of gNB, eNB, en-gNB, ng-eNB, gNB-CU-CP, gNB-CU-CP, gNB-DU, eNB-CU-CP, eNB-CU-CP, eNB-DU, IAB-node; and a wireless communication device (e.g., wireless communication device 1712 such as, e.g., a UE or terminal equipment) which supports any of E-UTRAN, NR, Multi Radio Access Technology (RAN) Dual Connectivity (MR-DC) such as, e.g., E-UTRA NR Dual Connectivity (EN-DC), NR E-UTRA Dual Connectivity (NE-DC), or NR Dual Connectivity (NR-DC).

Embodiments of the solution(s) described herein comprise at least some of the steps detailed below for a first RAN node, a second RAN node, or a wireless communication device (e.g., terminal equipment).

Aspect 1: RAN Node-Level Overload

Figure 18A:
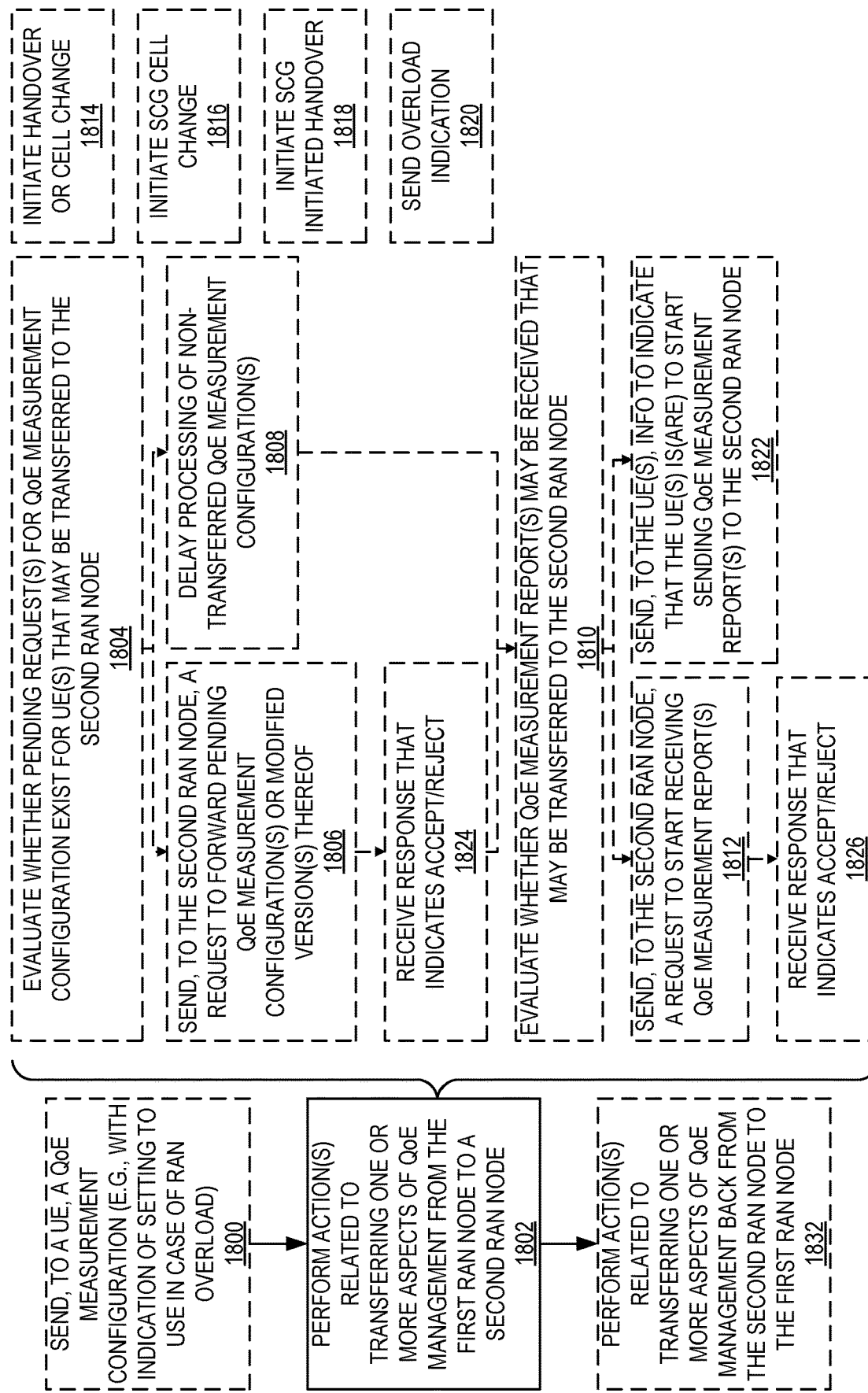
FIGS. 18A and 18B illustrate a method performed at a first Radio Access Network (RAN) node in accordance with some embodiments of the present disclosure.
Figure 18B:
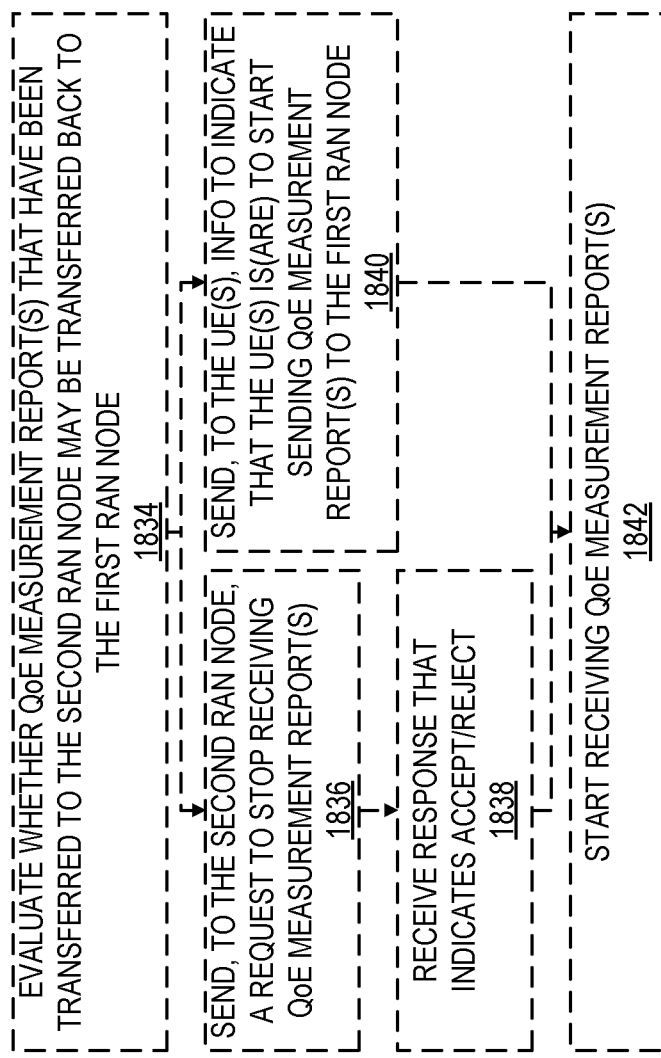

A first group of embodiments are related to transferring various aspects of QoE management from a first RAN node to a second RAN node and in consistence with this, instructing a UE, which is connected to both the first RAN node and the second RAN node in dual connectivity (DC) mode, to send QoE reports to the second RAN node. In accordance with embodiments of the present disclosure, FIGS. 18A and 18B illustrate a method performed at the first RAN node, where the method comprises one or more (or a combination of two or more) of the following steps.

Step 1800: At any time, irrespective of the RAN overload condition, the first RAN node sends, to at least one UE, a QoE measurement configuration that may comprise an explicit setting or an index to a setting to be used in case of RAN overload. This setting may include a setting to modify QoE measurement configurations and/or QoE reporting attributes. This may include aspects such as suspending or resuming the QoE reporting, changing the amount of QoE reporting per second, changing the maximum QoE report size, indicating a different cell towards which the UE can send the QoE reporting. Such modification can be activated, e.g., based on a pre-configured (e.g., default or semi-static) setting or dynamically by means of dedicated layer 3 (e.g., RRC) and/or layer 2 (e.g., MAC) signaling.

Steps 1802: When RAN overload condition is detected or sometime before the RAN overload condition is detected (e.g., 99% of the threshold indicating RAN overload is reached), the first RAN node performs one or more actions related to transferring one or more aspects of QoE management from the first RAN node to a second RAN node. These actions may include sending an instruction to an associated UE(s) to send QoE reports to the second RAN node. Performing the one or more actions related to transferring one or more aspects of QoE management from the first RAN node to the second RAN node includes one or more (or a combination of two or more) of the following steps.

Action 1804: The first RAN node evaluates whether a pending request(s) for QoE measurement configuration(s) exist(s) for UEs that may be transferred to a second RAN node.

In one variant, both the first RAN node and the second RAN node consist of logical functions defined for the same Radio Access Technology (RAT), such as LTE or NR.

In another variant, the first RAN node and the second RAN node consist of logical functions defined for the different RATs, such as LTE and NR.

Action 1806: The first RAN node sends, to a second RAN node, a request to forward a pending QoE measurement configuration(s) or a modified version (such as a default QoE measurement configuration(s)) of the pending QoE measurement configuration(s) to a UE or group of UEs that have an active radio connection towards both the first RAN node and the second RAN node or to a UE or group of UEs that are being redirected from the first RAN node to the second RAN node.

In one embodiment, all or only part of the pending QoE measurement configuration(s) may be sent from the first RAN node to the second RAN node and they may be sent all at the same time or in more than one step, e.g. based on pre-defined configuration or settings such as priority, 5QI, radio related measurements, preemption capability, preemption vulnerability.

As a first non-limiting example, in case of EN-DC configuration where the RAN overload is detected in the eNB (in the role of Master Node, MN), one or more attempts can be made to request the second RAN node (i.e., the gNB, which is the Secondary Node, SN) to send the QoE measurement configuration to the UE on behalf of the first RAN node.

As a second non-limiting example, in case of NR-DC configuration where the RAN overload is detected in (one of) the gNB-DU(s) of the gNB acting as Master Node, one or more attempts can be made from the Master Node towards the gNB acting as Secondary Node to send the QoE measurement configuration to the UE on behalf of the Master Node.

As a third non-limiting example, in case of at least one UE connected to a first RAN node (single connectivity case), when RAN overload is detected, a release with redirect can be sent to transfer the UE towards a different carrier (same or different RAT), including the QoE measurement configuration as part of the RRC Release.

As a fourth non-limiting example, a list of pending QoE measurement configurations for a set of UEs can be sent from first RAN node to the second RAN node.

Action 1808: The first RAN node delays processing of the QoE measurement configuration(s) that have not been transferred to the second RAN node (e.g., based on service criticality).

Step 1810: The first RAN node evaluates whether there are QoE measurement report(s) that may be received and whose reception can be transferred to the second RAN node, e.g., based on the periodicity of the previously delivered QoE report.

Step 1812: The first RAN node sends, to the second RAN node, a request to start receiving QoE measurement report(s) from one or a group of UEs.

In one embodiment, the first RAN node may request the second RAN node to collect QoE measurement report for all the ongoing QoE measurement configuration(s) previously started by the first RAN node.

In another embodiment, the first RAN node may request the second RAN node to collect QoE measurement report(s) for pending QoE measurement configuration(s) not yet started by the first RAN node and for which the first RAN node requested the second RAN node to forward such QoE measurement configuration to the UE(s).

In another embodiment, the first RAN node may request the second RAN node to collect QoE measurement report(s) only for part of the QoE measurement configuration(s) previously started by the first RAN node (e.g., only for specific services).

In another embodiment, the first RAN node may request the second RAN node to collect QoE measurement report(s) only for part of the pending QoE measurement configuration(s) not yet started by the first RAN node and for which the first RAN node requested the second RAN node to forward such QoE measurement configuration to the UE(s).

In another embodiment, the first RAN node may request the second RAN node to collect QoE measurement report(s) for a specific time interval, until the RAN overload situation is solved, or permanently.

Step 1814: In one embodiment, the first RAN node is a gNB-CU. The gNB-CU receives an overload indication from an associated gNB-DU. Upon receiving the overload indication from the gNB-DU, the gNB-CU may initiate the handover or cell change procedure to move at least one UE to another RAN node (the second RAN node) in non-overloaded condition.

Step 1816: In one embodiment, in a DC scenario, upon receiving overload indication from another RAN node, first RAN node may initiate a Secondary Cell Group (SCG) change procedure for at least one UE with the configured QoE measurement to hand over the UE to a second RAN node (e.g., another gNB-DU) that is in non-overloaded condition.

Step 1818: In one embodiment, in a DC scenario, the first RAN node is a gNB-CU owning a gNB-DU. Upon receiving an overload indication from the gNB-DU, the gNB-CU may initiate an SCG initiated handover for at least one UE with a configured QoE measurement(s) to hand over the UE to a second RAN node (e.g., another gNB-DU) that is in non-overloaded condition.

Step 1820: In one embodiment, in a Carrier Aggregation (CA) scenario with two RAN nodes involved, the RAN node where overload is detected sends to the other RAN node an overload indication of a certain cell.

Note that steps 1814-1820 may be performed in parallel when overload is detected (e.g., in parallel with step 1802). Also, note that steps 1814 and 1818 are part of partial overload.

Step 1822: The first RAN node sends, to the UE(s), a different QoE measurement configuration (or an index to a different QoE measurement configuration), to indicate the new RAN node, or RAN cell, towards which the QoE measurement report is to be sent.

In one embodiment, this sending may be realized either from the first RAN node directly or indirectly via the second RAN node.

In one embodiment, this sending may be realized by means of layer 3 signaling (such as RRC, e.g. a System Information update, an indication in the Paging Channel or via RRC Reconfiguration), layer 2 signaling (such as MAC, using a newly defined Control Element), downlink physical control channel (e.g., a new Downlink Control Information (DCI) format in Group Common Physical Downlink Control Channel (GC PDCCH)).

Step 1824: The first RAN node receives, from the second RAN node, an indication that the forwarding of QoE measurement configuration(s) to UE(s) on behalf of the first RAN node has been accepted or rejected.

Step 1826: The first RAN node receives, from the second RAN node, an indication that the reception of QoE measurement reports from the UE(s) instead of the first RAN node (or on behalf of the first RAN node) has been accepted or rejected.

Step 1828: The first RAN node stops receiving QoE measurement reporting for the UE or group of UEs for which the QoE measurement reporting has been moved to the second RAN node.

Step 1830: If the type of service and/or the radio conditions and/or configuration allow, the first RAN node initiates a mobility action such as handover to transfer the service from the first RAN node to the second RAN node together with related QoE measurement configuration or a release with redirect to transfer the UE towards a different carrier in the same RAT or in a different RAT.

As an example, RAN overload detection can be used as trigger to perform SRVCC from 4G to 3G. For a UE with an ongoing VOLTE call and ongoing QoE measurements, as soon as the UE is moved from the service eNB to an underlying Node B (UMTS), the QoE measurement configuration is also transferred and the QoE measurement reporting can continue in 3G.

Steps 1832: When RAN overload condition is solved (e.g., the load level is below 90% of the threshold indicating RAN overload), the first RAN node performs one or more actions related to transferring one or more aspects of QoE management back from the second RAN node to the first RAN node. These actions may include sending an instruction to an associated UE(s) to send QoE reports to the first RAN node. Performing the one or more actions related to transferring one or more aspects of QoE management back from the second RAN node to the first RAN node includes one or more (or a combination of two or more) of the following steps.

Step 1834: The first RAN node evaluates whether there are QoE measurement report(s) that have been transferred to the second RAN node and that may be transferred back to the first RAN node.

Step 1836: The first RAN node sends, to the second RAN node, a request to stop receiving the QoE measurement report(s) from one or a group of UEs for which the first RAN node previously requested to be received by the second RAN node and that the second RAN node accepted to receive.

Step 1838: The first RAN node receives, from the second RAN node, the indication that stop of reception of QoE measurement reports from the UE(s) instead of the first RAN node (or on behalf of the first RAN node) has been accepted or rejected.

Step 1840: The first RAN node sends, to the UE(s), a different QoE measurement configuration (or an index to a different QoE measurement configuration), to indicate the first RAN node (or respective cell) towards which the QoE measurement report(s) is (are) to be sent.

Step 1842: The first RAN node starts receiving QoE measurement reporting for the UE or group of UEs for which the QoE measurement reporting was moved to the second RAN node and then reverted to the first RAN node.

A second group of embodiments are not related to transferring QoE management from one RAN node to another RAN node (although some of the embodiments in the second group of embodiments may be combined with some of the embodiments in the first group of embodiments).

Figure 19:
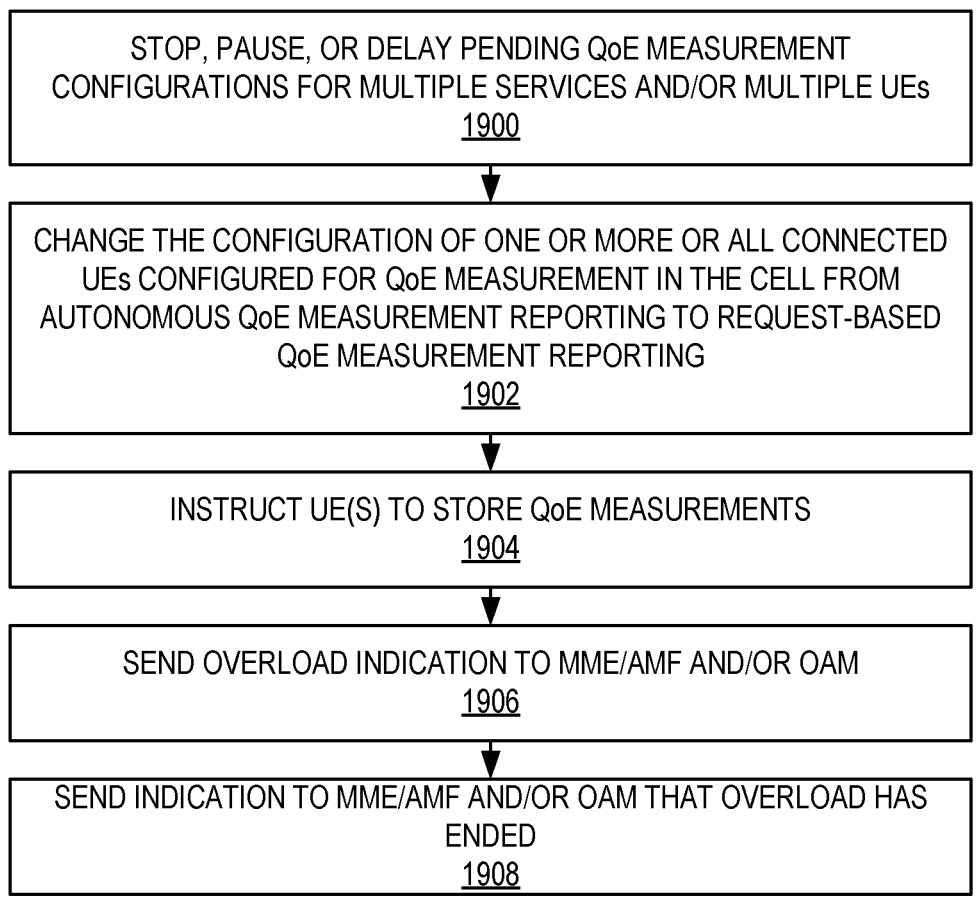
FIG. 19 illustrates a method performed by a RAN node in accordance with some other embodiments of the present disclosure.

As illustrated in FIG. 19, in this second group of embodiments, a method performed by the RAN node when the overload condition is detected (or about to be detected) and when the overload condition is resolved may include any one or more (or any combination of two or more) of the following:

Step 1900: The RAN node stops, delays, or pauses (e.g., using a stepwise approach) pending QoE measurement configurations for multiple services and/or multiple UEs.

In one embodiment, a stepwise approach is used, and the steps are based, e.g., on pre-defined rules or configuration setting such as service criticality, service type, service priority, 5QI, radio related thresholds, preemption capability, preemption vulnerability.

In one embodiment, when the RAN overload condition is solved, the RAN node reverts to a normal (non-overload) situation (e.g., following a stepwise approach).

Step 1902: The RAN node changes the configuration of one or more or all RRC_CONNECTED UEs configured for QoE measurement in the cell from autonomous QoE measurement reporting to request-based QoE measurement reporting (i.e., reporting on request from the network, e.g. using a solicitation mechanism.

The goal of a request-based QoE measurement reporting may be different, non-limiting examples are: to reduce the number of reporting per second, to remove the reporting for some services, to suspend the reporting for at least one service.

Step 1904: The RAN node instructs one or more UE(s) to store QoE measurements up to a certain limit. The limit could, e.g., be defined in size (number of bytes), time, number of reports etc. This could be based on pre-configuration which is activated by the RAN node when an overload condition, or an imminent overload condition, or a risk of an overload condition, is detected.

The indication to one or more UE(s) to stop, delay or pause QoE reporting, or to switch from UE autonomous reporting to solicited reporting (i.e., reporting on request from the RAN node), or to store QoE measurement reports, or to cease doing any of the preceding, could be performed using any of:

Broadcasting, e.g. using a field or a flag in the system information, i.e. in the MIB or one of the SIBs. This indication could be an implicit instruction to the affected UEs to perform one or more preconfigured, or standardized, action(s), e.g. that affected UEs should randomly generate a time delay until they send backlogged unsolicited QoE report(s). As another options, the UE's action could be to randomly generate a number to determine whether it should react on or ignore the broadcast indication. Another alternative, or a complementing feature, could be that the UEs are instructed to send maximum N (where N≥1) reports at a time and send successive bunches of N reports with a certain (minimum) time interval T in between. Both N and T could be preconfigured or standardized.

Group signaling, e.g. using the GC-PDCCH, where a new DCI format could be introduced for this indication. With this embodiment, the UEs configured for QoE measurement are also configured to monitor the GC-PDCCH. This indication could an implicit instruction to the affected UEs to perform one or more preconfigured, or standardized, action(s), e.g. that affected UEs should randomly generate a time delay until they send backlogged unsolicited QoE report(s). As another options, the UE's action could be to randomly generate a number to determine whether it should react on or ignore the broadcast indication. Another alternative, or a complementing feature, could be that the UEs are instructed to send maximum N (where N≥1) reports at a time and send successive bunches of N reports with a certain (minimum) time interval T in between. Both N and T could be preconfigured or standardized.

Dedicated signaling to each concerned UE (where the RAN node could select a set of UEs configured for QoE measurement to provide the instructions to, in order not to enforce more load mitigation actions than needed). Any of the means in the following non-limiting list may be used:

RRC signaling, e.g. an RRCReconfiguration message (in NR) or an RRCConnectionReconfiguration message (in LTE).

MAC signaling. This could be a new MAC CE for activating previously configured (e.g., via RRC signaling) actions, settings, or configurations to apply upon activation via this MAC CE. Another option is to use the already existing Recommended Bit Rate MAC CE, where the Bit Rate field could be set to indicate a low bit rate or a bit rate of 0 kbit/s, where the latter would mean setting the Bit Rate field to 1, where the Bit Rate field contains an index pointing into the following table of index to bit rate mapping.

| Index | NR Recommended Bit Rate value [kbit/s] |
|---|---|
| 0 | Note 1 |
| 1 | 0 |
| 2 | 9 |
| 3 | 11 |
| 4 | 13 |
| 5 | 17 |
| 6 | 21 |
| 7 | 25 |
| 8 | 29 |
| 9 | 32 |
| 10 | 36 |
| 11 | 40 |
| 12 | 48 |
| 13 | 56 |
| 14 | 72 |
| 15 | 88 |
| 16 | 104 |
| 17 | 120 |
| 18 | 140 |
| 19 | 160 |
| 20 | 180 |
| 21 | 200 |
| 22 | 220 |
| 23 | 240 |
| 24 | 260 |
| 25 | 280 |
| 26 | 300 |
| 27 | 350 |
| 28 | 400 |
| 29 | 450 |
| 30 | 500 |
| 31 | 600 |
| 32 | 700 |
| 33 | 800 |
| 34 | 900 |
| 35 | 1000 |
| 36 | 1100 |
| 37 | 1200 |
| 38 | 1300 |
| 39 | 1400 |
| 40 | 1500 |
| 41 | 1750 |
| 42 | 2000 |
| 43 | 2250 |
| 44 | 2500 |
| 45 | 2750 |
| 46 | 3000 |
| 47 | 3500 |
| 48 | 4000 |
| 49 | 4500 |
| 50 | 5000 |
| 51 | 5500 |
| 52 | 6000 |
| 53 | 6500 |
| 54 | 7000 |
| 55 | 7500 |
| 56 | 8000 |
| 57 | Reserved |
| 58 | Reserved |
| 59 | Reserved |
| 60 | Reserved |
| 61 | Reserved |
| 62 | Reserved |
| 63 | Reserved |

Note 1:
For bit rate recommendation message this index is used for indicating that no new recommendation on bit rate is given.

A new DCI format containing the indication.

Step 1906: The RAN node sends an overload indication to MME/AMF and/or OAM, indicating the overload condition at the RAN node. The MME/AMF or OAM may use this indication to avoid selecting overloaded RAN nodes for QoE measurement purposes.

Step 1908: The RAN node sends a second indication from overloaded RAN node to the MME/AMF and/or OAM, indicating that overload condition at RAN node is ceased. MME/AMF or OAM may use this indication to select the RAN node for QoE measurement purposes.

Figure 20:
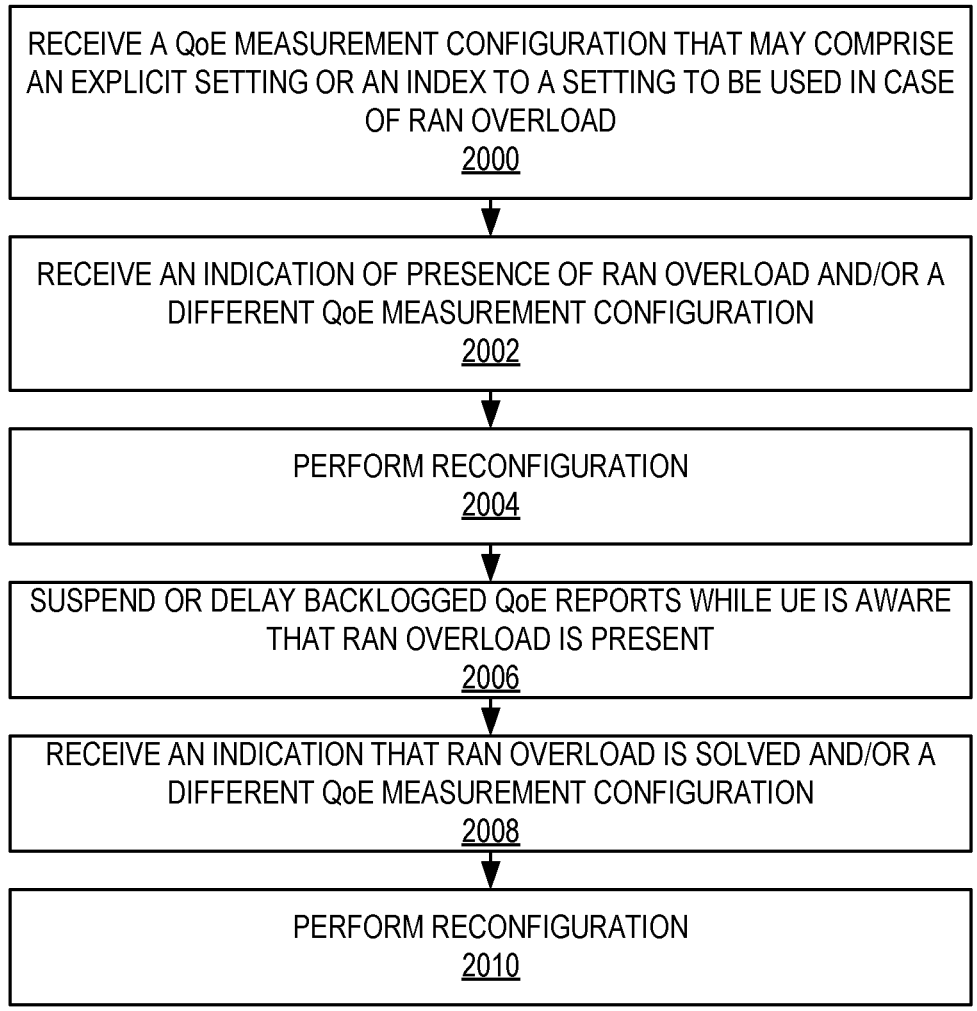
FIG. 20 illustrates a method performed by a User Equipment (UE) in accordance with some embodiments of the present disclosure.

As illustrated in FIG. 20, at the UE, one or more (or a combination of two or more) of the following steps may be performed:

Step 2000: The UE receives a QoE measurement configuration that may comprise an explicit setting or an index to a setting to be used in case of RAN overload. This setting may include a setting to modify QoE measurement configurations and/or QoE reporting attributes. This may include aspects such as suspending or resuming the QoE reporting, changing the amount of QoE reporting per second, changing the maximum QoE report size, indicating a different cell towards which the UE can send the QoE reporting. Such modification can be activated, e.g., based on a pre-configured (e.g., default or semi-static) setting or dynamically by means of dedicated layer 3 (e.g., RRC) and/or layer 2 (e.g., MAC) signaling.

Step 2002: The UE receives an indication of presence of RAN overload and/or a different QoE measurement configuration (or an index to a different QoE measurement configuration), either from the first RAN node or from the second RAN node.

The reception may be realized by means of layer 3 signaling (such as RRC, e.g. a System Information update, an indication in the Paging Channel or via RRC Reconfiguration), layer 2 signaling (such as MAC, using a newly defined Control Element), downlink physical control channel (e.g. a new DCI format in GC PDCCH).

The overload indication could be for a certain frequency, cell, cell group etc.

Step 2004: The UE performs reconfiguration according to the indications specified by the first RAN node or by the second RAN node (or preconfigured) when RAN overload is present in one or both first RAN node and second RAN node.

Step 2006: The UE suspends or delays backlogged QoE reports while UE is aware that RAN overload is present at the first RAN node and/or at the second RAN node, storing QoE reports, possibly up to a certain limit.

Step 2008: The UE receives an indication that RAN overload is solved and/or a different QoE measurement configuration (or an index to a different QoE measurement configuration), either from the first RAN node or from the second RAN node.

the reception may be realized by means of layer 3 signaling (such as RRC, e.g. a System Information update, an indication in the Paging Channel or via RRC Reconfiguration), layer 2 signaling (such as MAC, using a newly defined Control Element), downlink physical control channel (e.g. a new DCI format in GC PDCCH).

Step 2010: The UE performs the reconfiguration according to the indication specified by the first RAN node or by the second RAN node (or preconfigured) when RAN overload is solved in one or both first RAN node and second RAN node.

Figure 21A:
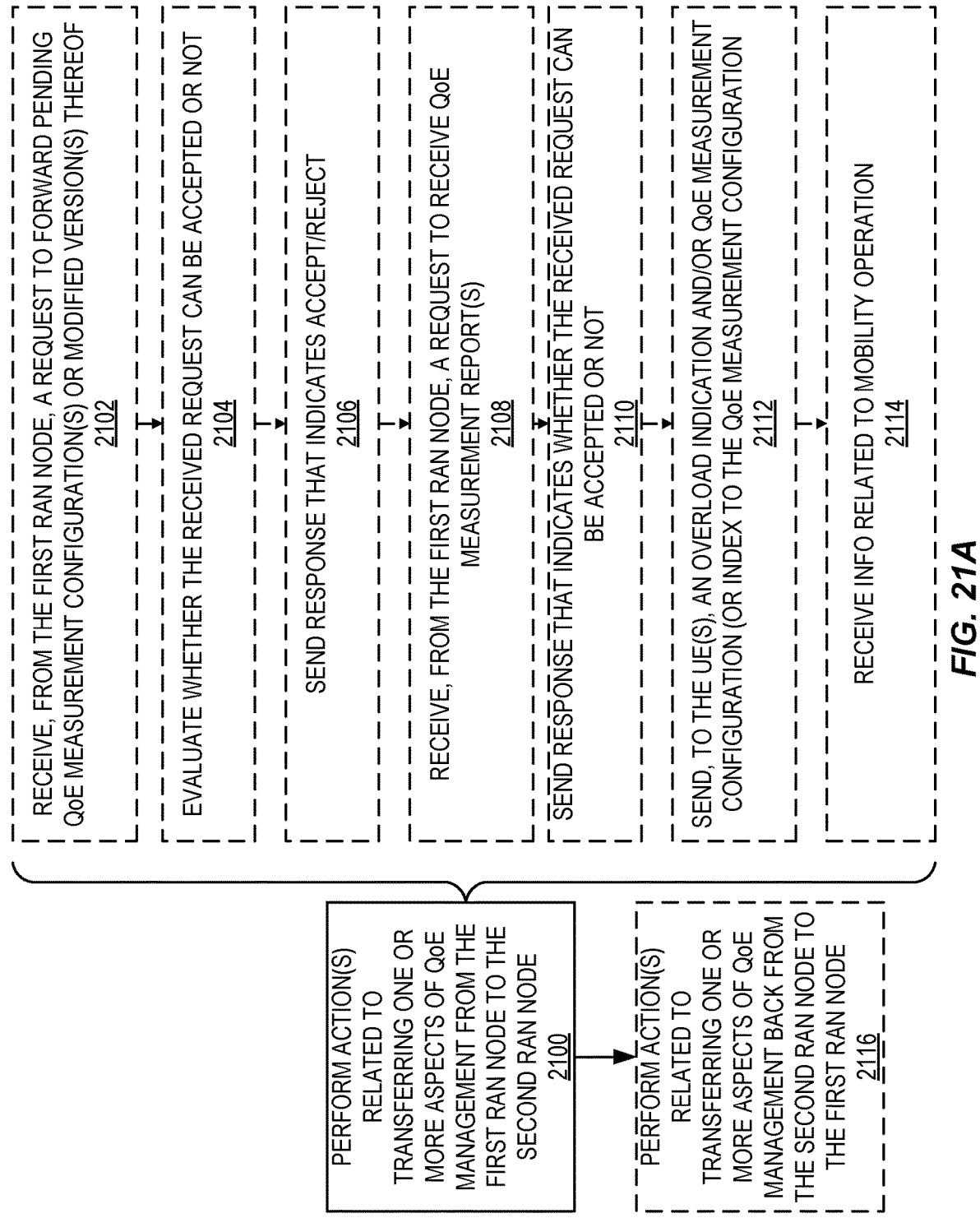
FIGS. 21A and 21B illustrate a method performed at a second RAN node in accordance with some embodiments of the present disclosure.
Figure 21B:
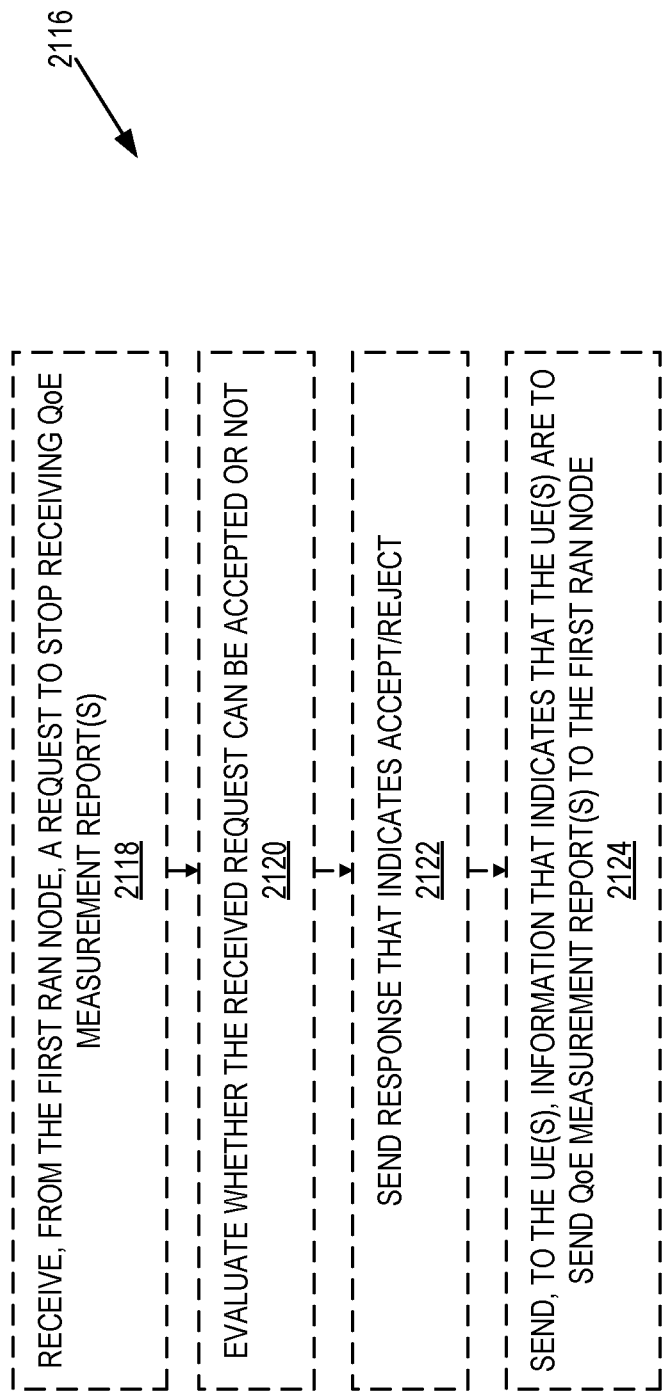

At the second RAN node, one or more (or a combination of two or more) of the following steps may be performed, as illustrated in FIGS. 21A and 21B:

Step 2100: When RAN overload is detected at the first RAN node, the second RAN node performs one or more actions related to transferring one or more aspects of QoE management from the first RAN node to the second RAN node. Performing the one or more actions related to transferring one or more aspects of QoE management from the first RAN node to the second RAN node includes one or more (or a combination of two or more) of the following steps.

Step 2102: The second RAN node receives, from the first RAN node, a request to forward a pending QoE measurement configuration(s) (or a modified version of it, such as a default configuration) to UEs that may have radio connection towards one or both the first RAN node and the second RAN node.

Step 2104: The second RAN node evaluates whether the request received at previous step is accepted or not.

Step 2106: The second RAN node sends, to the first RAN node, an indication that the request to forward QoE measurement configuration to one or a group of UEs instead of (or on behalf of) the first RAN node is accepted or not.

Step 2108: The second RAN node receives, from the first RAN node, a request to receive QoE measurement report(s) from one or a group of UEs that may have radio connection towards one or both the first RAN node and the second RAN node.

Step 2110: The second RAN node sends, to the first RAN node, an indication that the request to receive QoE measurement report(s) from one or a group of UEs is accepted or rejected.

Step 2112: The second RAN node sends, to the UE(s), an indication that RAN overload is present at the first RAN node (and possibly at the second RAN node) and/or the QoE measurement configuration received by the first RAN node or a modified version of it (such as a default configuration), or an index to a different QoE measurement configuration.

This sending may be realized by means of layer 3 signaling (such as RRC, e.g. a System Information update, an indication in the Paging Channel or via RRC Reconfiguration), layer 2 signaling (such as MAC, using a newly defined Control Element), downlink physical control channel (e.g. a new DCI format in GC PDCCH)

Step 2114: In case a (legacy) mobility action is initiated, the second RAN node may receive the QoE measurement configuration in addition to legacy information already defined for the selected mobility action.

Step 2116: When RAN overload is resolved at the first RAN node (and possibly at the second RAN node), the second RAN node performs one or more actions related to transferring one or more aspects of QoE management back from the second RAN node to the first RAN node. Performing the one or more actions related to transferring one or more aspects of QoE management back from the second RAN node to the first RAN node includes one or more (or a combination of two or more) of the following steps.

Step 2118: The second RAN node receives, from the first RAN node, a request to stop receiving the QoE measurement report(s) from one or a group of UEs for which the first RAN node previously requested to be received by the second RAN node.

Step 2120: The second RAN node evaluates whether there are QoE measurement report(s) that have been transferred to the second RAN node and that may be transferred back to the first RAN node.

Step 2122: The second RAN node sends, to the first RAN node, an indication that stop of reception of QoE measurement reports from the UE(s) instead of the first RAN node (or on behalf of the first RAN node) has been accepted or rejected.

Step 2124: The second RAN node sends, to the UE, an indication that RAN overload is resolved at the first RAN node (and possibly at the second RAN node) and/or the QoE measurement configuration received by the first RAN node or a modified version of it (such as a default configuration), or an index to a different QoE measurement configuration to be used when RAN overload is not present.

This sending may be realized by means of layer 3 signaling (such as RRC, e.g. a System Information update, an indication in the Paging Channel or via RRC Reconfiguration), layer 2 signaling (such as MAC, using a newly defined Control Element), downlink physical control channel (e.g. a new DCI format in GC PDCCH).

Aspect 2: IAB Network Overload Considerations

For UEs served by Integrated Access and Backhaul (IAB) nodes, the traffic is delivered to the UE-serving IAB-DU via one or multiple wireless backhaul hops. The serving IAB-DU then delivers the traffic to the UE via the Uu interface. The traffic from the IAB donor may be delivered to the serving IAB-DU via multiple paths, i.e. paths traversing different intermediate IAB node between the IAB donor and serving DU. For example, one of the paths can be used to carry the UE's QoE measurement configuration in downlink (DL) and the QoE report from the UE on the uplink (UL). Alternatively, different DL and UL paths can be used for carrying the UE's QoE measurement configuration in DL and the QoE report from the UE on the UL, respectively.

Figure 27:
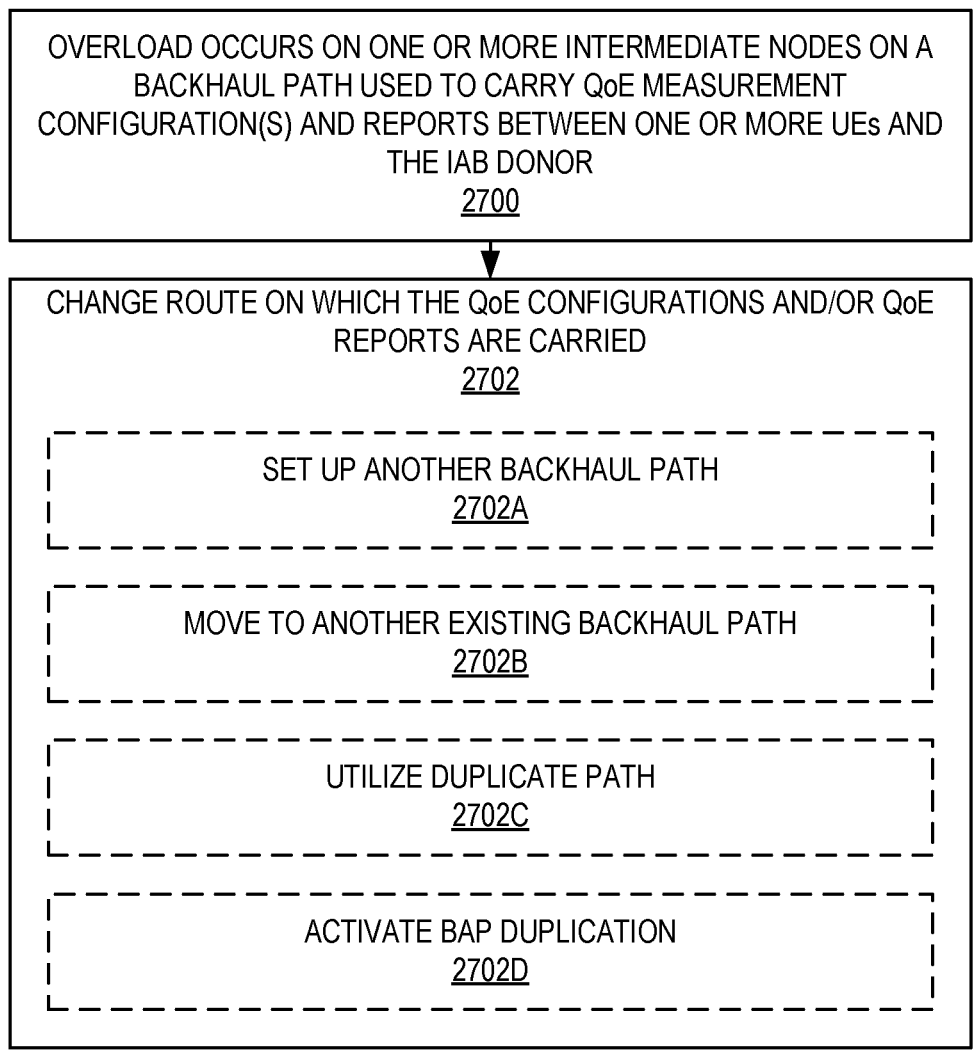
FIG. 27 illustrates a method performed by an Integrated Access and Backhaul (IAB) donor in accordance with one embodiment of the present disclosure.

In the context of the solution(s) disclosed herein, an overload occurs on one or more intermediate nodes on a backhaul path used to carry QoE measurement configuration(s) and reports between one or more UEs and the IAB donor (i.e., the overloaded node is not necessarily the IAB-DU serving the UE—the overload can be on donor DU or one or more of IAB nodes along the backhaul route). In this case, as illustrated in FIG. 27, in one embodiment, the IAB donor determines that overload has occurred on one or more intermediate nodes on a backhaul path used to carrier QoE measurement configuration(s) and reports between one or more UEs and the IAB donor (step 2700). The IAB donor changes the route on which the QoE configurations and/or reports are carried (step 2702). The IAB donor (i.e., IAB donor CU, in case of split donor node):

In one sub-embodiment, sets up another backhaul path for carrying UE's QoE measurement configuration/QoE report (step 2702A).

In another sub-embodiment, moves the QoE measurement configuration/QoE report transfer to another existing path (step 2702B).

In another sub-embodiment, the IAB donor and/or the UE activates a duplicate path (PDCP and/or GTP-U duplication) to carry the QoE configurations(s)/report(s), where the duplicate path carries this traffic concurrently with the original path (where one or more IAB nodes are overloaded on this original path) (step 2702C). Either the duplicate or the original path can be deactivated when the need for duplication ceases.

In another sub-embodiment, the IAB donor activates DL and/or UL Backhaul Adaptation Protocol (BAP) duplication, where the duplicate path is used to carry QoE configurations(s) and/or report(s), respectively (step 2702D).

Similar principles as described in the section "Aspect 1: RAN node-level overload" above can be applied here, with the main differences that:

The overload appears on one or more IAB nodes on the backhaul path and

That the consequent reaction of the IAB donor is to change the path for delivering QoE measurement/report so that the new path (or a newly-used path or a duplicate path) does not traverse any congested nodes.

In the process of establishing a new path, the IAB-donor-DU serving the UE(s) may be changed as well. In the above discussion, a "path" refers to a backhaul path, uniquely identified by a BAP routing ID, as specified in TS 38.340.

Aspect 3: Partial Overload-Overload of Certain Resources

In this case, only certain resources in a RAN node, rather than the entire RAN node, are overloaded (and among these overloaded resources, the resources for carrying QoE configuration(s)/report(s)). These resources can be, e.g., a backhaul bearer, a Service Radio Bearer (SRB), or a Data Radio Bearer (DRB), where, e.g., a buffer allocated to a DRB carrying the QoE configuration(s)/report(s) is overflowing.

Figure 28:
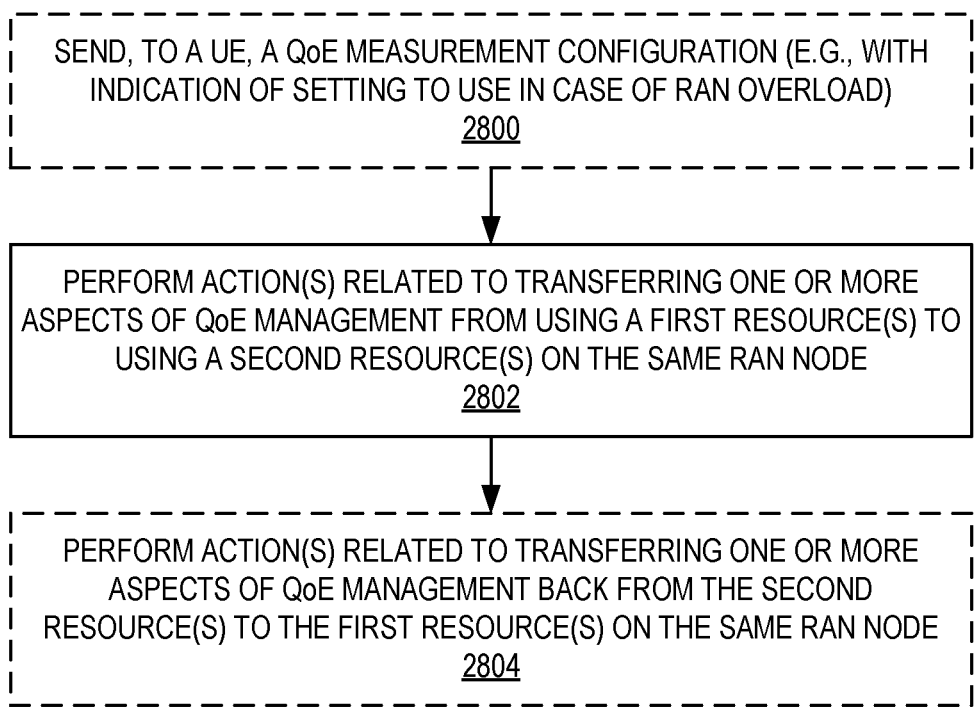
FIG. 28 illustrates the operation of a RAN node in accordance with another embodiment of the present disclosure.

In this embodiment, similar principles as described in the section "Aspect 1: RAN node-level overload" above can be applied, with the main difference that the responsibility may not be transferred to another RAN node, but rather to another resource within the same RAN node. Thus, as illustrated in FIG. 28, at any time, irrespective of the RAN overload condition, the RAN node sends, to at least one UE, a QoE measurement configuration that may comprise an explicit setting or an index to a setting to be used in case of RAN overload (step 2800). When RAN overload condition is detected or sometime before the RAN overload condition is detected (e.g., 99% of the threshold indicating RAN overload is reached), the RAN node performs one or more actions related to transferring one or more aspects of QoE management from using a first resource to using a second resource on the same RAN node (step 2802). Some non-limiting examples are presented below:

the responsibility for carrying the QoE configuration(s)/report(s) is transferred from one to another DRB.

in case of one gNB comprising two or more gNB-DUs and overload detected in one of the gNB-DU, one or more attempts may be made from the gNB-CU-CP to temporarily or permanently transfer the responsibility to receive the QoE measurement reports(s) towards another gNB-DU of the same gNB, e.g. by triggering an SCG change procedure to host the UE in a cell served by one of the non-overloaded gNB-DUs.

in case of IAB network, the overloaded resource can be at the IAB-DU serving the UE and/or in an intermediate IAB node and/or in the IAB-donor-DU.

When RAN overload condition is solved (e.g., the load level is below 90% of the threshold indicating RAN overload), the RAN node may perform one or more actions related to transferring one or more aspects of QoE management back from using the second resource to using the first resource on the same RAN node (step 2804).

Aspect 4: Embodiments Related to Buffer Status Reporting

Figure 29:
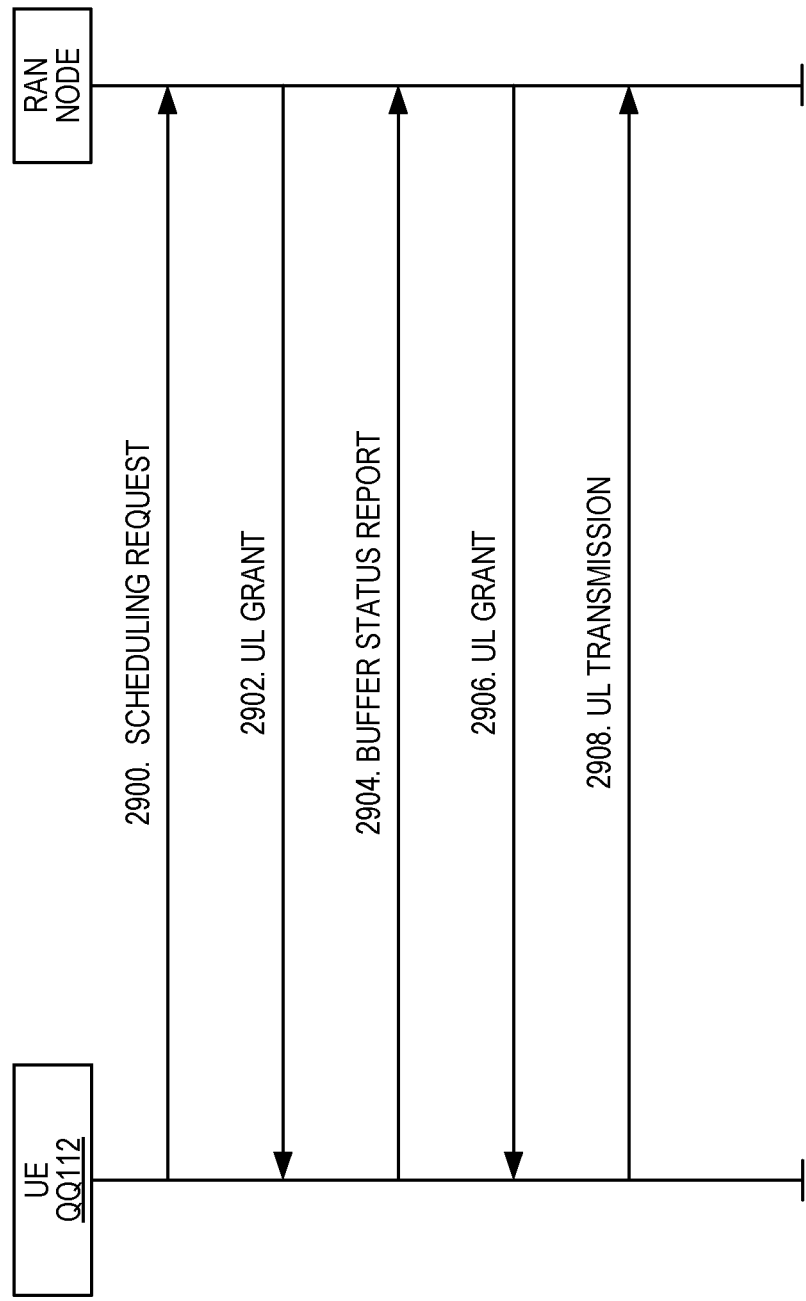
FIG. 29 illustrates a buffer status reporting procedure.

The embodiments in this section are all related to Buffer Status Reporting from the UE. One example scenario where embodiments are applicable is when the following two-roundtrip scheduling method, which is illustrated in FIG. 29, is used:

Step 2900: The UE sends a scheduling request on the PUCCH.

Step 2902: The RAN node responds with a small UL grant on the PDCCH, where the transmission resource allocated by the UL grant is small but large enough to transmit a Buffer Status Report (BSR).

Step 2904: The UE utilizes the uplink transmission resources allocated by the UL grant to send a Buffer Status Report in the form of a Short BSR MAC CE, a Short Truncated BSR MAC CE, a Long BSR MAC CE or a Long Truncated BSR MAC CE. Or as an option, a new BSR MAC CE, tentatively denoted "X BSR MAC CE". The BSR informs the RAN node of the amount of buffered data in the UE which is pending uplink transmission.

Step 2906: The network sends a second UL grant to the UE, where the amount of data in the UE pending uplink transmission is taken into account in the allocated transmission resource size.

Step 2908: The UE utilizes the uplink transmission resources allocated by the second UL grant to transmit all or a part of the buffered uplink data. (This step is not part of the actual scheduling.)

Figure 30:
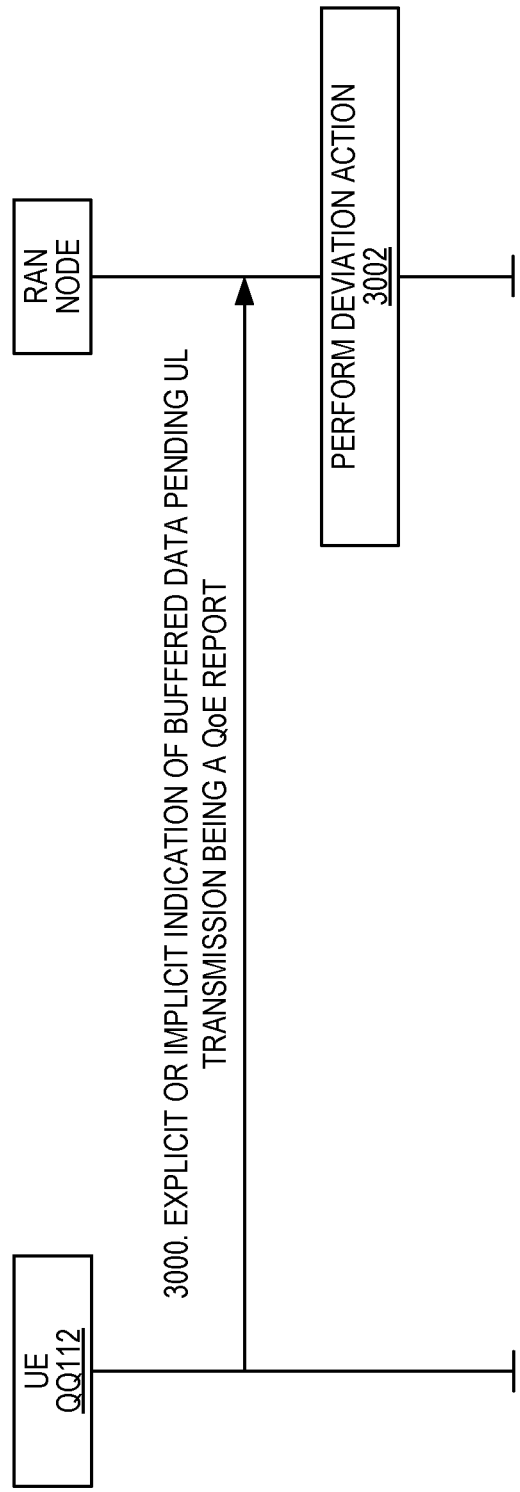
FIG. 30 illustrates a method performed by a RAN node in accordance with another embodiment of the present disclosure.

As illustrated in FIG. 30, in one embodiment, within the context of the procedure of FIG. 29, the RAN node receives, from the UE, an explicit or implicit indication that the buffered data pending uplink transmission is a QoE report (step 3000). In one embodiment, a new indication is introduced in one of the existing MAC CEs for BSR signaling, or a new X BSR MAC CE format is introduced for this purpose, where the indication informs the RAN node that the buffered data pending uplink transmission is a QoE report. In another embodiment, a new logical channel is introduced for transmission of QoE reports from the UE to the network. As one option, a new Signaling Radio Bearer, e.g. SRB5, could be used for transmission of QoE reports, and this new SRB5 could then be mapped to the new logical channel. The new logical channel could then through RRC configuration be mapped to a logical channel group, e.g. logical channel group N, optionally containing no other logical channel. When the BSR from the UE indicates pending uplink data for the logical channel group containing the logical channel for QoE report transfer, e.g. logical channel group N, the RAN node is informed that the UE's pending uplink data contains a QoE report.

In response to the information that the uplink data pending transmission in the UE is a QoE report, the RAN node performs a deviating action, i.e. an action which deviates from the regular action to be taken when the pending uplink data is not a QoE report, or when it is unknown to the RAN node whether the pending uplink data is a QoE report or not, and wherein such a regular action would be to transmit an UL grant to the UE, allocating uplink transmission resources for the UE to utilize to transmit all or part of the buffered uplink data (step 3002).

As one embodiment, the RAN node's deviating action is to ignore the scheduling request, i.e. refrain from allocating any uplink transmission resources, i.e. refrain from transmitting an UL grant.

As another embodiment, the RAN node's deviating action is to transmit a DCI to the UE on the PDCCH, informing the UE that no uplink transmission resources will be allocated for transmission of the QoE report. This signaling would require a new DCI format.

As another embodiment, the RAN node's deviating action is to transmit a DCI to the UE on the PDCCH, instructing the UE to refrain from requesting uplink transmission resources for the purpose of transmitting QoE reports for a certain time period or until further notice. The time period could be explicitly indicated in the DCI, e.g. in the form of an index pointing into a configured table (e.g., previously configured via the system information or dedicated RRC signaling) or a table specified in the standard.

As another embodiment, the RAN node's deviating action is to transmit a DCI to the UE on the PDCCH, instructing the UE to stop, delay or pause QoE reporting and/or to store QoE reports (as previously described) or to enter a QoE report soliciting mode (i.e., reporting on request). The DCI could optionally contain an indication of a time period during which this is valid, e.g. in the form of an index pointing into a preconfigured or standardized table. This would require a new DCI format.

As another embodiment, the RAN node's deviating action is to transmit a MAC CE to the UE to instruct the UE to stop, delay or pause QoE reporting and/or to store QoE reports (as previously described) or to enter a QoE report soliciting mode (i.e., reporting on request). The MAC CE could optionally contain an indication of a time period during which this is valid, e.g. in the form of an index pointing into a preconfigured or standardized table. This would require a new MAC CE.

As another embodiment, the RAN node's deviating action is to send an RRC message to the UE (e.g., an RRCReconfiguration message in NR or an RRCConnectionReconfiguration message in LTE), instructing the UE to stop, delay or pause QoE reporting and/or to store QoE reports (as previously described) or to enter a QoE report soliciting mode (i.e., reporting on request). The RRC message could optionally contain an indication of a time period during which this is valid, e.g. in the form of an index pointing into a preconfigured or standardized table.

As another embodiment, if the RAN node is informed of the pending QoE report through a BSR indicating pending uplink data for a logical channel group containing the above described new logical channel for QoE transfer, and the BSR also indicates presence of pending uplink data for one or more other logical channel group(s), the RAN node's deviating action is to transmit a DCI to the UE on the PDCCH, containing an UL grant and an indication to the UE that it is not allowed to utilize the UL grant for transmission of the QoE report data. Optionally, the DCI could also indicate to the UE, explicitly or implicitly, that it should stop, delay, or pause QoE reporting and/or store QoE reports (as previously described) or enter a QoE report soliciting mode (i.e., reporting on request) until further notice or during a certain time period which could be preconfigured, standardized or indicated in the DCI, e.g. in the form of an index pointing into a preconfigured table or a standardized table. As another option, the RAN node could, subsequent to transmitting the described DCI, send a MAC CE to the UE (including the preceding downlink scheduling allocation on the PDCCH) to instruct the UE to stop, delay or pause QoE reporting and/or to store QoE reports (as previously described) or to enter a QoE report soliciting mode (i.e., reporting on request), as previously described. The MAC CE could optionally contain an indication of a time period during which this is valid, e.g. in the form of an index pointing into a preconfigured or standardized table.

Additional Details

Figure 22:
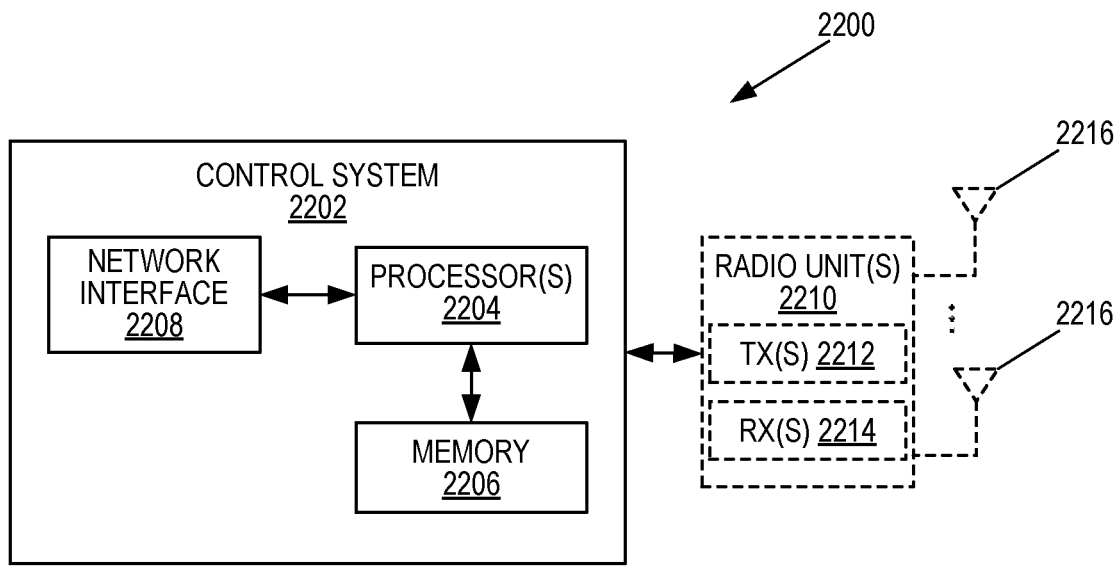
FIGS. 22, 23, and 24 are schematic block diagrams of example embodiments of a RAN node.

FIG. 22 is a schematic block diagram of a RAN node 2200 according to some embodiments of the present disclosure.

Optional features are represented by dashed boxes. The RAN node 2200 may be, for example, a base station 1702 or 1706 or a network node that implements all or part of the functionality of the base station 1702 or gNB described herein (e.g., implements the gNB-CU, gNB-DU, gNB-CU-CP, or gNB-CU-UP). As illustrated, the RAN node 2200 includes a control system 2202 that includes one or more processors 2204 (e.g., Central Processing Units (CPUs), Application Specific Integrated Circuits (ASICs), Field Programmable Gate Arrays (FPGAs), and/or the like), memory 2206, and a network interface 2208. The one or more processors 2204 are also referred to herein as processing circuitry. In addition, the RAN node 2200 may include one or more radio units 2210 that each includes one or more transmitters 2212 and one or more receivers 2214 coupled to one or more antennas 2216. The radio units 2210 may be referred to or be part of radio interface circuitry. In some embodiments, the radio unit(s) 2210 is external to the control system 2202 and connected to the control system 2202 via, e.g., a wired connection (e.g., an optical cable). However, in some other embodiments, the radio unit(s) 2210 and potentially the antenna(s) 2216 are integrated together with the control system 2202. The one or more processors 2204 operate to provide one or more functions of the RAN node 2200 as described herein (e.g., one or more functions of the first RAN node or the second RAN node described above, e.g., with respect to FIGS. 18A and 18B, FIG. 19, FIGS. 21A and 21B, FIG. 27, FIG. 28, FIG. 29, or FIG. 30). In some embodiments, the function(s) are implemented in software that is stored, e.g., in the memory 2206 and executed by the one or more processors 2204.

Figure 23:
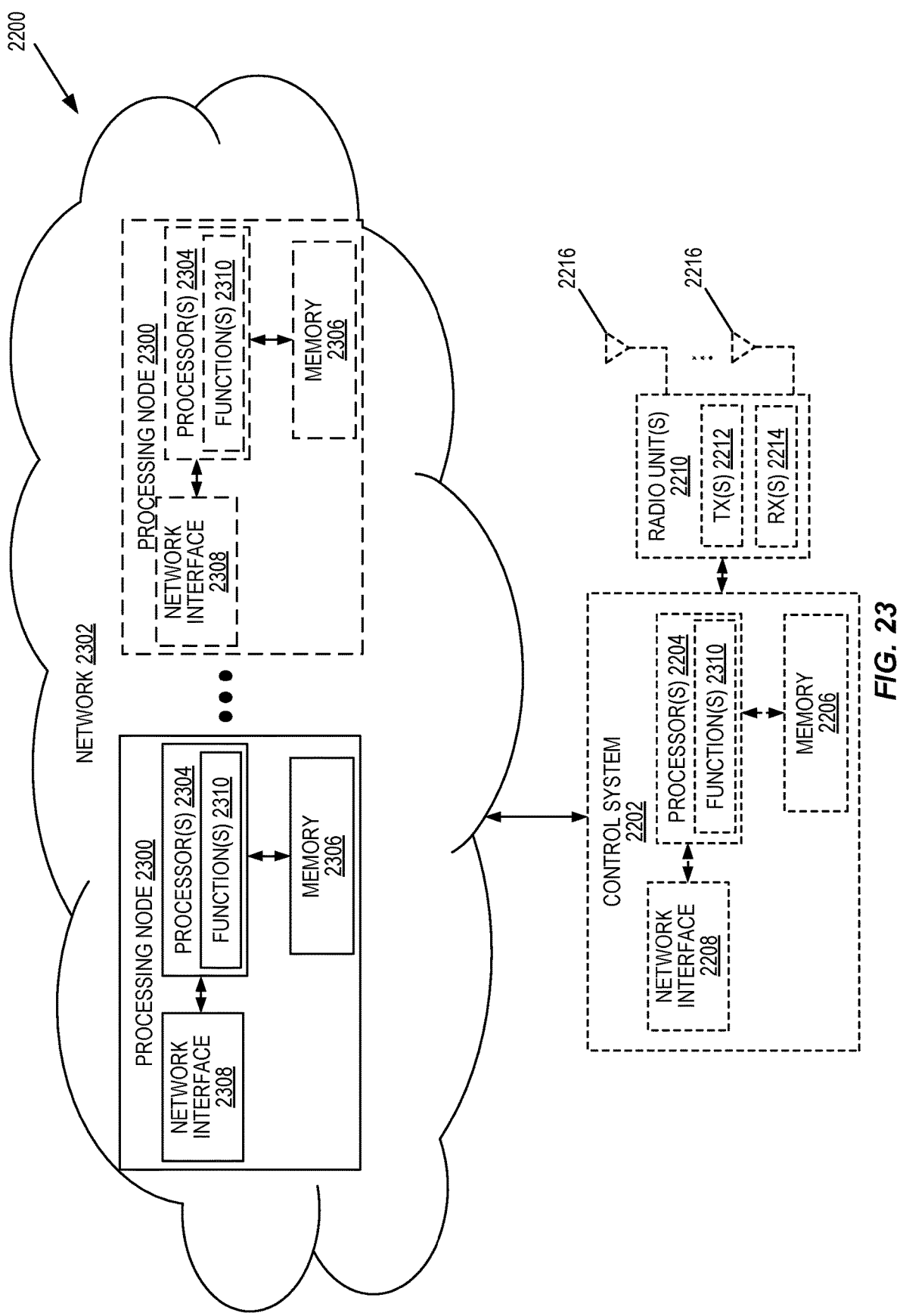

FIG. 23 is a schematic block diagram that illustrates a virtualized embodiment of the RAN node 2200 according to some embodiments of the present disclosure. This discussion is equally applicable to other types of network nodes. Further, other types of network nodes may have similar virtualized architectures. Again, optional features are represented by dashed boxes.

As used herein, a "virtualized" RAN node is an implementation of the RAN node 2200 in which at least a portion of the functionality of the RAN node 2200 is implemented as a virtual component(s) (e.g., via a virtual machine(s) executing on a physical processing node(s) in a network(s)). As illustrated, in this example, the RAN node 2200 may include the control system 2202 and/or the one or more radio units 2210, as described above. The control system 2202 may be connected to the radio unit(s) 2210 via, for example, an optical cable or the like. The radio access node 2200 includes one or more processing nodes 2300 coupled to or included as part of a network(s) 2302. If present, the control system 2202 or the radio unit(s) are connected to the processing node(s) 2300 via the network 2302. Each processing node 2300 includes one or more processors 2304 (e.g., CPUs, ASICs, FPGAS, and/or the like), memory 2306, and a network interface 2308.

In this example, functions 2310 of the RAN node 2200 described herein (e.g., one or more functions of the first RAN node or the second RAN node described above, e.g., with respect to FIGS. 18A and 18B, FIG. 19, FIGS. 21A and 21B, FIG. 27, FIG. 28, FIG. 29, or FIG. 30) are implemented at the one or more processing nodes 2300 or distributed across the one or more processing nodes 2300 and the control system 2202 and/or the radio unit(s) 2210 in any desired manner. In some particular embodiments, some or all of the functions 2310 of the RAN node 2200 described herein are implemented as virtual components executed by one or more virtual machines implemented in a virtual environment(s) hosted by the processing node(s) 2300. As will be appreciated by one of ordinary skill in the art, additional signaling or communication between the processing node(s) 2300 and the control system 2202 is used in order to carry out at least some of the desired functions 2310. Notably, in some embodiments, the control system 2202 may not be included, in which case the radio unit(s) 2210 communicate directly with the processing node(s) 2300 via an appropriate network interface(s).

In some embodiments, a computer program including instructions which, when executed by at least one processor, causes the at least one processor to carry out the functionality of the RAN node 2200 or a node (e.g., a processing node 2300) implementing one or more of the functions 2310 of the RAN node 2200 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 24:
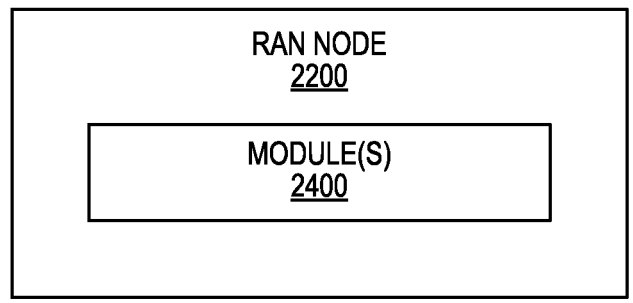

FIG. 24 is a schematic block diagram of the RAN node 2200 according to some other embodiments of the present disclosure. The RAN node 2200 includes one or more modules 2400, each of which is implemented in software. The module(s) 2400 provide the functionality of RAN node 2200 described herein (e.g., one or more functions of the first RAN node or the second RAN node described above, e.g., with respect to FIGS. 18A and 18B, FIG. 19, FIGS. 21A and 21B, FIG. 27, FIG. 28, FIG. 29, or FIG. 30). This discussion is equally applicable to the processing node 2300 of FIG. 23 where the modules 2400 may be implemented at one of the processing nodes 2300 or distributed across multiple processing nodes 2300 and/or distributed across the processing node(s) 2300 and the control system 2202.

Figure 25:
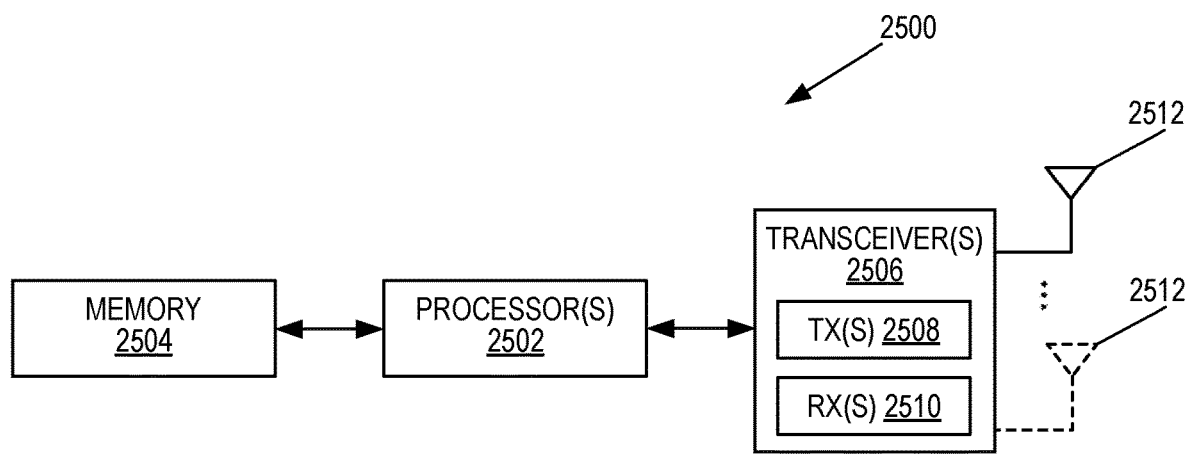
FIGS. 25 and 26 are schematic block diagrams of example embodiments of a wireless communication device (e.g., a UE)

FIG. 25 is a schematic block diagram of a wireless communication device 2500 (e.g., a UE or terminal device) according to some embodiments of the present disclosure. As illustrated, the wireless communication device 2500 includes one or more processors 2502 (e.g., CPUs, ASICs, FPGAs, and/or the like), memory 2504, and one or more transceivers 2506 each including one or more transmitters 2508 and one or more receivers 2510 coupled to one or more antennas 2512. The transceiver(s) 2506 includes radio-front end circuitry connected to the antenna(s) 2512 that is configured to condition signals communicated between the antenna(s) 2512 and the processor(s) 2502, as will be appreciated by on of ordinary skill in the art. The processors 2502 are also referred to herein as processing circuitry. The transceivers 2506 are also referred to herein as radio circuitry. In some embodiments, the functionality of the wireless communication device 2500 described above (e.g., one or more functions of the UE or terminal device described above, e.g., with respect to FIG. 20, 29, or 30) may be fully or partially implemented in software that is, e.g., stored in the memory 2504 and executed by the processor(s) 2502. Note that the wireless communication device 2500 may include additional components not illustrated in FIG. 25 such as, e.g., one or more user interface components (e.g., an input/output interface including a display, buttons, a touch screen, a microphone, a speaker(s), and/or the like and/or any other components for allowing input of information into the wireless communication device 2500 and/or allowing output of information from the wireless communication device 2500), a power supply (e.g., a battery and associated power circuitry), etc.

In some embodiments, a computer program including instructions which, when executed by at least one processor, causes the at least one processor to carry out the functionality of the wireless communication device 2500 according to any of the embodiments described herein (e.g., one or more functions of the UE or terminal device described above, e.g., with respect to FIG. 20, 29, or 30) is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 26:
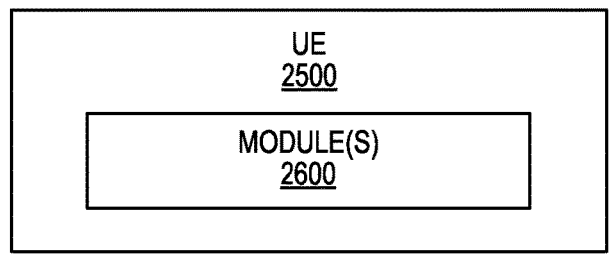

FIG. 26 is a schematic block diagram of the wireless communication device 2500 according to some other embodiments of the present disclosure. The wireless communication device 2500 includes one or more modules 2600, each of which is implemented in software. The module(s) 2600 provide the functionality of the wireless communication device 2500 described herein (e.g., one or more functions of the UE or terminal device described above, e.g., with respect to FIG. 20, 29, or 30).

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

Some example embodiments of the present disclosure are as follows:

Embodiment 1: A method performed by a first Radio Access Network, RAN, node for handling Quality of Experience, QoE, measurement configuration and/or reporting during RAN overload, the method comprising performing (1802; 1900; 1902; 1904; 1906) one or more actions related to one or more aspects of QoE measurement configuration and/or QoE measurement reporting that mitigate an RAN overload condition.

Embodiment 2: The method of embodiment 1 wherein performing (1802; 1900; 1902; 1904; 1906) the one or more actions comprises performing (1802) one or more actions related to transfer of one or more aspects of QoE measurement configuration and/or QoE measurement reporting from the first RAN node to a second RAN node.

Embodiment 3: The method of embodiment 2 wherein the first and second RAN nodes are of the same Radio Access Technology, RAT.

Embodiment 4: The method of embodiment 2 wherein the first and second RAN nodes are of different Radio Access Technologies, RATs.

Embodiment 5: The method of any of embodiments 2 to 4 wherein performing (1802) one or more actions related to transfer of one or more aspects of QoE measurement configuration and/or QoE measurement reporting from the first RAN node to the second RAN node comprises performing (1802) one or more actions to transfer responsibility of sending QoE measurement configuration(s) and/or sending QoE measurement configuration update(s) for one or more UEs from the first RAN node to the second RAN node.

Embodiment 6: The method of any of embodiments 2 to 5 wherein performing (1802) one or more actions related to transfer of one or more aspects of QoE measurement configuration and/or QoE measurement reporting from the first RAN node to the second RAN node comprises performing (1802) one or more actions to transfer responsibility of receiving QoE measurement report(s) from one or more UEs from the first RAN node to the second RAN node.

Embodiment 7: The method of any of embodiments 2 to 6 wherein the second RAN node is selected as part of a mobility procedure (e.g., handover, cell change, or release with redirect).

Embodiment 8: The method of any of embodiments 2 to 7 wherein, for a UE served by an IAB node(s), performing (1802) one or more actions related to transfer of one or more aspects of QoE measurement from the first RAN node to the second RAN node comprises changing a backhaul path used for delivery of QoE measurement configuration(s) and/or QoE measurement reports for the UE.

Embodiment 9: The method of embodiment 1 wherein performing (1802; 1900; 1902; 1904; 1906) the one or more actions comprises modifying (1900; 1902; 1904) QoE measurement configurations and/or QoE reporting attributes (e.g., suspending, pausing, or delaying QoE measurement reporting, or changing a maximum QoE report size).

Embodiment 10: The method of embodiment 1 or 9 wherein performing (1802; 1900; 1902; 1904; 1906) the one or more actions comprises stopping, delaying, or pausing pending QoE measurement configurations for one or more services (e.g., two or more services) and/or one or more UEs (e.g., two or more UEs).

Embodiment 11: The method of embodiment 1, 9, or 10 wherein performing (1802; 1900; 1902; 1904; 1906) the one or more actions comprises changing (1902) the configuration of one or more or all UEs configured for QoE measurement in a respective cell from autonomous QoE measurement reporting to request-based QoE measurement reporting.

Embodiment 12: The method of embodiment 1, 9, 10, or 11 wherein performing (1802; 1900; 1902; 1904; 1906) the one or more actions comprises instructing (1904) a UE(s) to store QoE measurements up to a certain limit (e.g., up to a certain size, time, number of reports, etc.).

Embodiment 13: The method of embodiment 1, 9, 10, 11, or 12 wherein performing (1802; 1900; 1902; 1904; 1906) the one or more actions comprises sending (1906) an overload indication to another network entity (e.g., MME, AMF, QAM).

Embodiment 14: The method of any of embodiments 1 to 13 wherein performing (1802; 1900; 1902; 1904; 1906) the one or more actions comprises performing (1802) one or more actions either responsive to determining that a RAN overload condition exists or prior to a RAN overload condition (e.g., upon reaching a threshold condition that is less than a RAN overload condition).

Embodiment 15: The method of embodiment 14 wherein the RAN overload condition is a full RAN overload condition or a partial RAN overload condition.

Embodiment 16: The method of any of embodiments 1 to 15 further comprising sending (1800), to a UE, an indication of how the UE (1712) is to operate with respect to QoE measurement and/or QoE reporting in the event of a RAN overload condition.

Embodiment 17: A method performed by a first Radio Access Network, RAN, node for handling Quality of Experience, QoE, measurement configuration and/or reporting during RAN overload, the method comprising performing (1802) one or more actions related to transfer of one or more aspects of QoE measurement from a first set of resources of the first RAN node to a second set of resources of the first RAN node responsive to a partial RAN overload (i.e., a RAN overload on the first set of resources).

Embodiment 18: A first Radio Access Network, RAN, node for handling Quality of Experience, QoE, measurement configuration and/or reporting during RAN overload, the first RAN node adapted to perform the method of any of embodiments 1 to 16.

Embodiment 19: A method performed by a second Radio Access Network, RAN, node for handling Quality of Experience, QoE, measurement configuration and/or reporting during RAN overload, the method comprising performing (2100) one or more actions related to transfer of one or more aspects of QoE measurement configuration and/or QoE measurement reporting from a first RAN node to the second RAN node.

Embodiment 20: The method of embodiment 19 wherein the first RAN node and the second RAN node are of the same Radio Access Technology, RAT.

Embodiment 21: The method of embodiment 19 wherein the first RAN node and the second RAN node are of different Radio Access Technologies, RATs.

Embodiment 22: The method of embodiment 19 wherein performing (2100) the one or more actions comprises receiving (2102), from the first RAN node, a request for transfer of responsibility of sending QoE measurement configuration(s) and/or sending QoE measurement configuration update(s) for one or more UEs from the first RAN node to the second RAN node.

Embodiment 23: The method of any of embodiments 19 to 22 wherein performing (2100) the one or more actions comprises receiving (2108), from the first RAN node, a request to transfer responsibility of receiving QoE measurement report(s) from one or more UEs from the first RAN node to the second RAN node.

Embodiment 24: The method of any of embodiments 19 to 23 wherein the second RAN node is selected as part of a mobility procedure (e.g., handover, cell change, or release with redirect).

Embodiment 25: The method of any of embodiments 19 to 24 further comprising performing (2116) one or more actions related to transfer of one or more aspects of QoE measurement configuration and/or QoE measurement reporting back from the second RAN node to the first RAN node.

Embodiment 26: A second Radio Access Network, RAN, node for handling Quality of Experience, QoE, measurement configuration and/or reporting during RAN overload, the second RAN node adapted to perform the method of any of embodiments 19 to 25.

Embodiment 27: A method performed by a wireless communication device in relation to handling Quality of Experience, QoE, measurement configuration and/or reporting during RAN overload, the method comprising one or more of the following: receiving (2000), from a first RAN node, a QoE measurement configuration that comprises an explicit setting or an index to a setting to be used in case of RAN overload; receiving (2002) an indication of presence of RAN overload and/or a different QoE measurement configuration (or an index to a different QoE measurement configuration) either from the first RAN node or a second RAN node; performing (2004) a reconfiguration related to QoE measurement and/or QoE measurement reporting responsive to the explicit setting and/or the received indication of the presence of RAN overload and/or the different QoE measurement configuration; suspending or delaying (2006) backlogged QoE measurement reports while aware of the presence of RAN overload.

Embodiment 28: A wireless communication device in relation to handling Quality of Experience, QoE, measurement configuration and/or reporting during RAN overload, the wireless communication device adapted to perform the method of embodiment 27.

Those skilled in the art will recognize improvements and modifications to the embodiments of the present disclosure. All such improvements and modifications are considered within the scope of the concepts disclosed herein.

The invention claimed is:

1. A method performed by a first Radio Access Network, RAN, node for handling Quality of Experience, QoE, measurement configuration and/or reporting during RAN overload, the method comprising:
   performing one or more actions related to one or more aspects of QoE measurement configuration, QoE measurement reporting, or both QoE measurement configuration and QoE measurement reporting that mitigate an RAN overload condition;
   wherein performing the one or more actions comprises performing one or more actions related to transfer of one or more aspects of QoE measurement configuration from the first RAN node to a second RAN node, transfer of one or more aspects of QoE measurement reporting from the first RAN node to the second RAN node, or both;
   wherein performing one or more actions related to transfer of one or more aspects of QoE measurement configuration from the first RAN node to a second RAN node, transfer of one or more aspects of QoE measurement reporting from the first RAN node to the second RAN node, or both comprises:
   performing one or more actions to transfer responsibility of sending QoE measurement configuration(s) for one or more UEs from the first RAN node to the second RAN node,
   performing one or more actions to transfer responsibility of sending QoE measurement configuration update(s) for one or more UEs from the first RAN node to the second RAN node, or
   performing both one or more actions to transfer responsibility of sending QoE measurement configuration(s) for one or more UEs from the first RAN node to the second RAN node and one or more actions to transfer responsibility of sending QoE measurement configuration update(s) for one or more UEs from the first RAN node to the second RAN node.

2. The method of claim 1 wherein the first and second RAN nodes are of the same Radio Access Technology, RAT.

3. The method of claim 1 wherein the first and second RAN nodes are of different Radio Access Technologies, RATs.

4. The method of claim 1 wherein performing one or more actions related to transfer of one or more aspects of QoE measurement configuration from the first RAN node to a second RAN node, transfer of one or more aspects of QoE measurement reporting from the first RAN node to the second RAN node, or both comprises:
performing one or more actions to transfer responsibility of receiving QoE measurement report(s) from one or more UEs from the first RAN node to the second RAN node.

5. The method of claim 1 wherein the second RAN node is selected as part of a mobility procedure.

6. The method of claim 1 wherein, for a UE served by an Integrated Access and Backhaul, IAB, node, performing one or more actions related to transfer of one or more aspects of QoE measurement configuration from the first RAN node to a second RAN node, transfer of one or more aspects of QoE measurement reporting from the first RAN node to the second RAN node, or both comprises:
changing a backhaul path used for delivery of QoE measurement configuration(s) for the UE;
changing a backhaul path used for delivery of QoE measurement reports for the UE; or
changing a backhaul path used for delivery of QoE measurement configuration(s) and QoE measurement reports for the UE.

7. The method of claim 1 wherein performing the one or more actions comprises performing one or more actions either responsive to determining that a RAN overload condition exists or prior to a RAN overload condition.

8. The method of claim 7 wherein the RAN overload condition is an entire RAN overload condition or a partial RAN overload condition.

9. The method of claim 1 further comprising sending, to a UE, an indication of how the UE is to operate with respect to QoE measurement and/or QoE reporting in the event of a RAN overload condition.

10. A method performed by a first Radio Access Network, RAN, node for handling Quality of Experience, QoE, measurement configuration and/or reporting during RAN overload, the method comprising:
performing one or more actions related to one or more aspects of QoE measurement configuration, QoE measurement reporting, or both QoE measurement configuration and QoE measurement reporting that mitigate an RAN overload condition;
wherein performing the one or more actions comprises:
modifying QoE measurement configurations;
modifying QoE reporting attributes; or
modifying both QoE measurement configurations and QoE reporting attributes;
wherein performing one or more actions related to transfer of one or more aspects of QoE measurement configuration from the first RAN node to a second RAN node, transfer of one or more aspects of QoE measurement reporting from the first RAN node to the second RAN node, or both comprises:
performing one or more actions to transfer responsibility of sending QoE measurement configuration(s) for one or more UEs from the first RAN node to the second RAN node,
performing one or more actions to transfer responsibility of sending QoE measurement configuration update(s) for one or more UEs from the first RAN node to the second RAN node, or
performing both one or more actions to transfer responsibility of sending QoE measurement configuration(s) for one or more UEs from the first RAN node to the second RAN node and one or more actions to transfer responsibility of sending QoE measurement configuration update(s) for one or more UEs from the first RAN node to the second RAN node.

11. The method of claim 10 wherein performing the one or more actions comprises:
stopping, delaying, or pausing pending QoE measurement configurations for one or more services;
stopping, delaying, or pausing pending QoE measurement configurations for one or more UEs; or
stopping, delaying, or pausing pending QoE measurement configurations for one or more services and stopping, delaying, or pausing pending QoE measurement configurations for one or more UEs.

12. The method of claim 10 wherein performing the one or more actions comprises changing the configuration of one or more or all UEs configured for QoE measurement in a respective cell from autonomous QoE measurement reporting to request-based QoE measurement reporting.

13. The method of claim 10 wherein performing the one or more actions comprises instructing one or more UEs to store QoE measurements up to a certain limit, the certain limit defined in terms of size, time, or number of reports.

14. The method of claim 10 wherein performing the one or more actions comprises sending an overload indication to another network entity.

15. A method performed by a first Radio Access Network, RAN, node for handling Quality of Experience, QoE, measurement configuration and/or reporting during RAN overload, the method comprising:
performing one or more actions related to one or more aspects of QoE measurement configuration, QoE measurement reporting, or both QoE measurement configuration and QoE measurement reporting that mitigate an RAN overload condition;
wherein the first RAN node is an Integrated Access and Backhaul, IAB, donor node, and performing the one or more actions comprises performing the one or more actions responsive to RAN overload on one or more intermediate IAB nodes between the IAB donor node and one or more User Equipments, UEs;
wherein performing one or more actions related to transfer of one or more aspects of QoE measurement configuration from the first RAN node to a second RAN node, transfer of one or more aspects of QoE measurement reporting from the first RAN node to the second RAN node, or both comprises:
performing one or more actions to transfer responsibility of sending QoE measurement configuration(s) for one or more UEs from the first RAN node to the second RAN node,
performing one or more actions to transfer responsibility of sending QoE measurement configuration update(s) for one or more UEs from the first RAN node to the second RAN node, or
performing both one or more actions to transfer responsibility of sending QoE measurement configuration(s) for one or more UEs from the first RAN node to the second RAN node and one or more actions to transfer responsibility of sending QoE measurement configuration update(s) for one or more UEs from the first RAN node to the second RAN node.

16. The method of claim 15 wherein performing the one or more actions comprises changing a route on which QoE measurement configurations are carried, a route on which QoE measurement reports are carried, or a route on which both QoE measurement configurations and QoE measurement reports are carried.

17. A method performed by a first Radio Access Network, RAN, node for handling Quality of Experience, QoE, measurement configuration and/or reporting during RAN overload, the method comprising:
- performing one or more actions related to one or more aspects of QoE measurement configuration, QoE measurement reporting, or both QoE measurement configuration and QoE measurement reporting that mitigate an RAN overload condition;
- wherein performing the one or more actions comprises performing one or more actions related to transfer of one or more aspects of QoE measurement configuration from a first resource of the first RAN node to a second resource of the first RAN node, transfer of one or more aspects of QoE measurement reporting from a first resource of the first RAN node to a second resource of the first RAN node, or both;
- wherein performing one or more actions related to transfer of one or more aspects of QoE measurement configuration from the first RAN node to a second RAN node, transfer of one or more aspects of QoE measurement reporting from the first RAN node to the second RAN node, or both comprises:
  - performing one or more actions to transfer responsibility of sending QoE measurement configuration(s) for one or more UEs from the first RAN node to the second RAN node,
  - performing one or more actions to transfer responsibility of sending QoE measurement configuration update(s) for one or more UEs from the first RAN node to the second RAN node, or
  - performing both one or more actions to transfer responsibility of sending QoE measurement configuration(s) for one or more UEs from the first RAN node to the second RAN node and one or more actions to transfer responsibility of sending QoE measurement configuration update(s) for one or more UEs from the first RAN node to the second RAN node.

18. A method performed by a first Radio Access Network, RAN, node for handling Quality of Experience, QoE, measurement configuration and/or reporting during RAN overload, the method comprising:
- receiving, from a User Equipment, UE, an indication that buffered data at the UE for uplink transmission comprises a QoE measurement report; and
- performing one or more actions related to one or more aspects of QoE measurement configuration, QoE measurement reporting, or both QoE measurement configuration and QoE measurement reporting that mitigate an RAN overload condition;
- wherein performing the one or more actions comprises, responsive to receiving the indication that the buffered data at the UE for uplink transmission comprises a QoE measurement report, performing a deviation action, the deviation action being an action that deviates from a normal action taken by the first RAN node when buffered data at the UE for uplink transmission does not comprise a QoE measurement report;
- wherein the deviation action comprises:
- ignoring an associated scheduling request;
- transmitting a downlink control information to the UE that informs the UE that no uplink transmission resources will be allocated for transmission of the QoE measurement report;
- transmitting a downlink control information to the UE that instructs the UE to refrain from requesting uplink transmission resources for the purpose of transmitting QoE measurement reports for a certain time period or until further notice;
- transmitting a downlink control information to the UE that instructs the UE to stop, delay, or pause QoE measurement reporting;
- transmitting a downlink control information to the UE that instructs the UE to store QoE reports;
- transmitting a downlink control information to the UE that instructs the UE to enter a mode of operation in which the UE sends QoE measurement reports upon request;
- transmitting a Medium Access Control, MAC, Control Element, CE, to the UE that instructs the UE to stop, delay, or pause QoE measurement reporting;
- transmitting a MAC CE to the UE that instructs the UE to store QoE measurement reports;
- transmitting a MAC CE to the UE that instructs the UE to enter a mode of operation in which the UE sends QoE measurement reports upon request;
- transmitting a Radio Resource Control, RRC, message to the UE that instructs the UE to stop, delay, or pause QoE measurement reporting;
- transmitting a RRC message to the UE that instructs the UE to store QoE measurement reports;
- transmitting a RRC message to the UE that instructs the UE to enter a mode of operation in which the UE sends QoE measurement reports upon request; or
- transmitting a downlink control channel to the UE that contains an uplink grant and an indication to the UE that the UE is not allowed to utilize the uplink grant for transmission of the QoE measurement report.

* * * * *